United States Patent
Wang et al.

(10) Patent No.: US 12,513,313 B2
(45) Date of Patent: Dec. 30, 2025

(54) ILLUMINATION COMPENSATION METHOD, ENCODER, AND DECODER

(71) Applicant: GUANGDONG OPPO MOBILE TELECOMMUNICATIONS CORP., LTD., Guangdong (CN)

(72) Inventors: Fan Wang, Guangdong (CN); Zhihuang Xie, Guangdong (CN); Dong Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/450,849

(22) Filed: Aug. 16, 2023

(65) Prior Publication Data

US 2023/0396780 A1   Dec. 7, 2023

Related U.S. Application Data

(63) Continuation of application No. PCT/CN2021/077327, filed on Feb. 22, 2021.

(51) Int. Cl.
*H04N 19/186* (2014.01)
*H04N 19/105* (2014.01)
(Continued)

(52) U.S. Cl.
CPC ......... *H04N 19/186* (2014.11); *H04N 19/139* (2014.11); *H04N 19/159* (2014.11);
(Continued)

(58) Field of Classification Search
None
See application file for complete search history.

(56) References Cited

U.S. PATENT DOCUMENTS

| | | | |
|---|---|---|---|
| 2007/0177671 A1 | 8/2007 | Yang et al. | |
| 2021/0266531 A1* | 8/2021 | Kang | H04N 19/53 |
| 2021/0344909 A1* | 11/2021 | Liu | H04N 19/52 |

FOREIGN PATENT DOCUMENTS

| | | |
|---|---|---|
| CN | 101072355 | 11/2007 |
| CN | 109417641 | 3/2019 |

(Continued)

OTHER PUBLICATIONS

Hisilicon, "About Conformity bitstreams and documents issues," AVS M4089, Dec. 2016.
(Continued)

*Primary Examiner* — Lindsay J Uhl
(74) *Attorney, Agent, or Firm* — Hodgson Russ LLP

(57) ABSTRACT

An illumination compensation method, an encoder, and a decoder are provided in implementations of the disclosure. A bitstream is obtained, and the bitstream is parsed to obtain an illumination compensation enabled flag. An illumination compensation frame-level enabled flag in the bitstream is obtained, when the illumination compensation enabled flag is valid. An illumination compensation usage flag in the bitstream is obtained, when the illumination compensation frame-level enabled flag is valid. Index information of a target illumination compensation mode in the bitstream is obtained, when the illumination compensation usage flag is valid. Illumination compensation is performed on a current block based on the index information of the target illumination compensation mode.

8 Claims, 8 Drawing Sheets

--- determine an illumination compensation frame-level enabled flag based on luma information of a current frame — S201 enable an illumination compensation function for the current frame, and perform illumination compensation on a current block of the current frame, to obtain an illumination prediction value, when the illumination compensation frame-level enabled flag is valid — S202 signal the illumination compensation frame-level enabled flag to a bitstream — S203

(51) Int. Cl.
  *H04N 19/139* (2014.01)
  *H04N 19/159* (2014.01)
  *H04N 19/172* (2014.01)
  *H04N 19/176* (2014.01)
  *H04N 19/52* (2014.01)
  *H04N 19/70* (2014.01)

(52) U.S. Cl.
  CPC ......... *H04N 19/172* (2014.11); *H04N 19/176* (2014.11); *H04N 19/52* (2014.11); *H04N 19/70* (2014.11); *H04N 19/105* (2014.11)

(56) References Cited

FOREIGN PATENT DOCUMENTS

| CN | 111194554 | 5/2020 |
|---|---|---|
| CN | 111263147 | 6/2020 |
| CN | 112203085 | 1/2021 |
| CN | 112203086 | 1/2021 |
| CN | 116762339 | 9/2023 |
| KR | 20200143296 | 12/2020 |
| WO | 2020147745 | 7/2020 |

OTHER PUBLICATIONS

Peking University, "Inter-frame local illumination compensation technology," AVS_M5038, Dec. 2019.
Oppo, "Interframe Predictive Illumination Compensation," AVS M6007, Dec. 2020.
Qualcomm Incorporated, "Compression efficiency methods beyond VVC," Joint Video Experts Team (JVET) of ITU-T SG 16 WP 3 and ISO/IEC JTC 1/SC 29, JVET-U0100, Jan. 2021.
WIPO, International Search Report and Written Opinion for International Application No. PCT/CN2021/077327, Nov. 11, 2021.
CNIPA, First Office Action for CN Application No. 202311445183.3, May 24, 2025.
CNIPA, Second Office Action for CN Application No. 202311445183.3, Aug. 7, 2025.

* cited by examiner

ILLUMINATION COMPENSATION METHOD, ENCODER, AND DECODER

CROSS-REFERENCE TO RELATED APPLICATION(S)

This application is a continuation of International Application No. PCT/CN2021/077327, filed Feb. 22, 2021, the entire disclosure of which is hereby incorporated by reference.

TECHNICAL FIELD

This disclosure relates to the field of video encoding technology, relating to but not limited to an illumination compensation method, an encoder, and a decoder.

BACKGROUND

In video coding, in the process of coding a current block, besides intra prediction, inter prediction can also be used. For inter prediction, an inter prediction process can be performed on each coding unit to calculate a prediction block.

In the related art, in inter prediction, illumination compensation technology is used to eliminate illumination angle changes caused by illumination changes and object movements, shadow changes caused by relative motion of objects before and after, luma changes introduced by post-production, etc. There may be similar textures but different luma between the current block (coding block or decoding block) and a reference block. In this case, the illumination compensation technology is used for the current block, and an illumination compensation factor(s) of the current block is determined by using some of reconstructed samples in the left column and the top row of the current block and samples at corresponding positions in samples in the left column and the top row of the reference block, to perform illumination compensation.

However, for the current block in normal natural video, a bit rate of a bitstream will increase due to the overhead of flags at the coding unit level when using the illumination compensation technology, which, for specific illumination video or picture, leads to the high overhead of coding bits of the sequence with no need of illumination compensation, which affects the final coding efficiency.

SUMMARY

In a first aspect, implementations of the disclosure provide an illumination compensation method. The method is applied to a decoder and includes the following. A bitstream is obtained, and the bitstream is parsed to obtain an illumination compensation enabled flag. An illumination compensation frame-level enabled flag in the bitstream is obtained, when the illumination compensation enabled flag is valid. An illumination compensation usage flag in the bitstream is obtained, when the illumination compensation frame-level enabled flag is valid. Index information of a target illumination compensation mode in the bitstream is obtained, when the illumination compensation usage flag is valid. Illumination compensation is performed on a current block based on the index information of the target illumination compensation mode.

In a second aspect, implementations of the disclosure further provide an illumination compensation method. The method is applied to an encoder and includes the following. An illumination compensation frame-level enabled flag is determined based on luma information of a current frame. An illumination compensation function is enabled for the current frame, and performing illumination compensation on a current block of the current frame, to obtain an illumination prediction value, when the illumination compensation frame-level enabled flag is valid. The illumination compensation frame-level enabled flag is signalled to a bitstream.

In a third aspect, implementations of the disclosure provide a decoder. The decoder includes at least one processor and a memory. The memory is coupled to the at least one processor and stores at least one computer executable instruction thereon. When executed by the at least one processor, the at least one computer executable instruction causes the at least one processor to execute the method of the first aspect.

In a fourth aspect, implementations of the disclosure provide an encoder. The encoder includes at least one processor and a memory. The memory is coupled to the at least one processor and stores at least one computer executable instruction thereon. When executed by the at least one processor, the at least one computer executable instruction causes the at least one processor to execute the method of the second aspect.

DETAILED DESCRIPTION

Figure 1A:
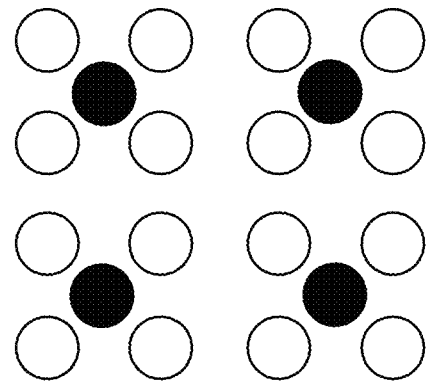
FIGS. 1A-1C are schematic diagrams of distribution of components in different colour formats provided in implementations of the disclosure.

Technical solutions in implementations of the disclosure will be clearly and completely described in the following with reference to the drawings in the implementations of the disclosure. It is to be understood that the implementations described herein are intended only to explain the relevant disclosure and not to limit the disclosure. In addition, it should be noted that for ease of description, only portions related to the disclosure are illustrated in the drawings.

In a video picture, a first colour component, a second colour component, and a third colour component are generally used to represent a current block (for example, coding block (CB)). The three colour components are respectively a luma component, a blue chroma component, and a red chroma component, specifically, the luma component is generally denoted by the symbol Y, the blue chroma component is generally denoted by the symbol Cb or U, and the red chroma component is generally denoted by the symbol Cr or V. In this way, the video picture can be expressed in YCbCr format or YUV format.

Figure 1B:
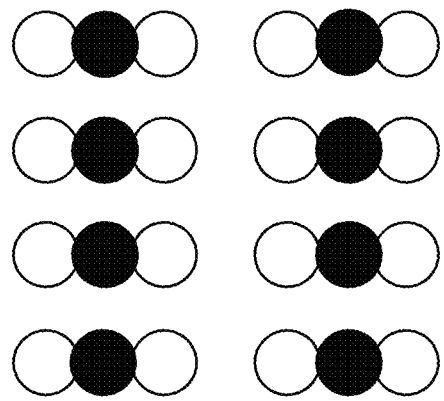
Figure 1C:
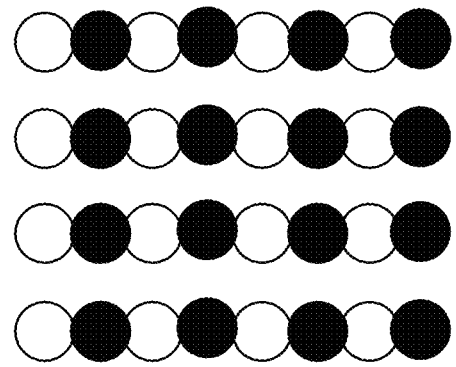
Figure 4:
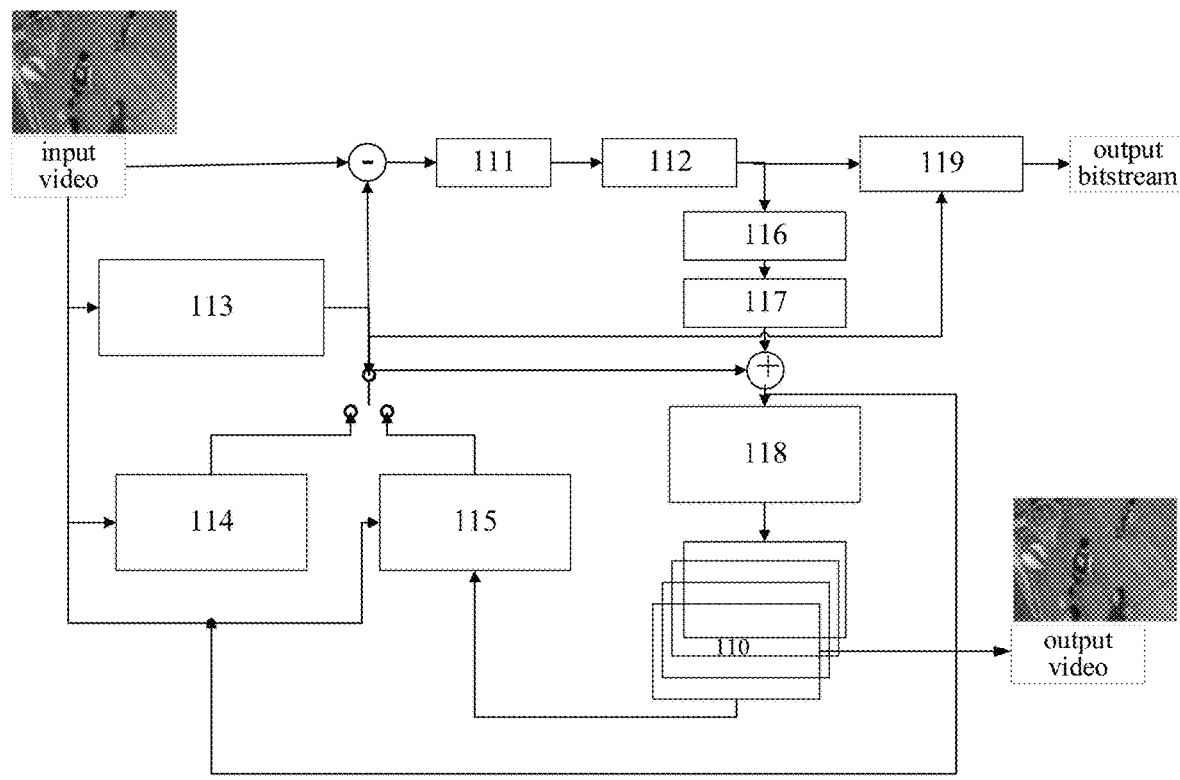
FIG. 4 is a schematic structural diagram of a video encoding system provided in implementations of the disclosure.

Generally, digital video compression technology is applied to picture data with YCbCr (YUV) colour encoding method. YUV ratio is generally 4:2:0, 4:2:2, or 4:4:4. Y represents luma, Cb (U) represents blue chroma, Cr (V) represents red chroma, and U and V represent chroma, for describing colour and saturation. FIGS. 1A to 1C illustrate diagrams of distribution of various components in different colour formats, where the Y component is white and the UV components are black gray. As illustrated in FIG. 1A, in colour format, 4:2:0 denotes four luma components and two chroma components (YYYYCbCr) per four pixels, as illustrated in FIG. 1B, 4:2:2 denotes four luma components and four chroma components (YYYYCbCrCbCr) per four pixels, and as illustrated in FIG. 1C, 4:4:4 denotes a full pixel display (YYYYCbCrCbCrCbCr).

At present, the general video coding standards are based on block-based hybrid encoding framework. Each frame in the video picture is partitioned into a square largest coding unit (LCU) of the same size (such as 128×128, 64×64, etc.), and each largest coding unit can also be partitioned into a rectangular coding unit (CU) according to rules. Moreover, the coding unit may be partitioned into smaller prediction units (PU). Specifically, the hybrid encoding framework may include modules like prediction, transform, quantization, entropy coding, in-loop filter. The prediction module may include intra prediction and inter prediction, and the inter prediction may include motion estimation and motion compensation. Because there is a strong correlation between neighbouring samples in one video picture, intra prediction can eliminate the spatial redundancy between neighbouring samples in video coding technology. For inter prediction, picture information of different frames can be referenced, and motion estimation is used to search for motion vector information that best matches a current partition block, to eliminate temporal redundancy. For the transformation, the predicted picture block is transformed into the frequency domain, the energy is redistributed, and information insensitive to human eyes can be removed in combination with quantization, which is used to eliminate visual redundancy. The entropy coding can eliminate character redundancy according to the current context model and the probability information of binary bitstream.

Figure 2:
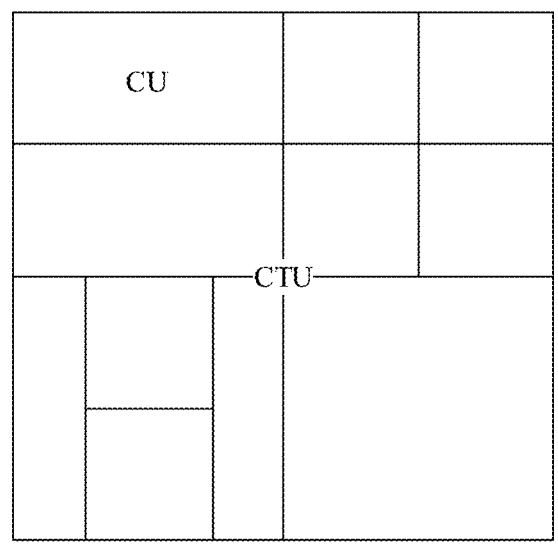
FIG. 2 is a schematic diagram of partition of coding unit provided in implementations of the disclosure.

It should be noted that, in the video encoding process, the encoder first reads the picture information and partitions the picture into multiple coding tree units (CTU), and one coding tree unit can be further partitioned into multiple coding units (CU), which can be rectangular blocks or square blocks. The specific relationship can refer to FIG. 2.

In the inter prediction process, for the current coding unit, the information of reference blocks of different pictures is considered for prediction, that is, according to a most general encoding order from left to right and from top to bottom, the top-left coding unit, the top coding unit, and the left coding unit of the reference block can be used as reference information to predict that the digital video input by the current coding unit is in colour format, that is, the input source of the current mainstream digital video encoder is in YUV 4:2:0 format, that is, every four pixels of the picture are composed of four Y components and two UV components. The encoder encodes the Y component and the UV components respectively, and the encoding tools and technologies adopted are slightly different, and meanwhile the decoder also decodes according to different formats.

For the inter prediction part of digital video coding, the coding block of the current frame is mainly predicted by considering the reconstructed picture information of the decoded frame, the picture block in the reference frame is searched by motion estimation, the matched block with the smallest error is found based on mean square error (MSE) or other algorithms, and the motion vector (MV) corresponding to the current coding unit is obtained, the motion compensation is performed on the reference block pointed by the MV to obtain the prediction block, and the residual error between the prediction block and the original picture block is calculated to obtain residual information, and through transformation and quantization, the residual information is transmitted to the decoder. After receiving and parsing the bitstream, the decoder obtains the residual information through inverse transformation and inverse quantization, and the residual information is added to the predicted picture block predicted by the decoder to obtain the reconstructed picture block.

Based on the above concept, exemplarily, illumination compensation technology may be applied to various prediction technologies such as inter prediction, inter-non-rectangular prediction, affine transformation prediction, and the like, which is not limited in implementations of the disclosure.

Figure 3:
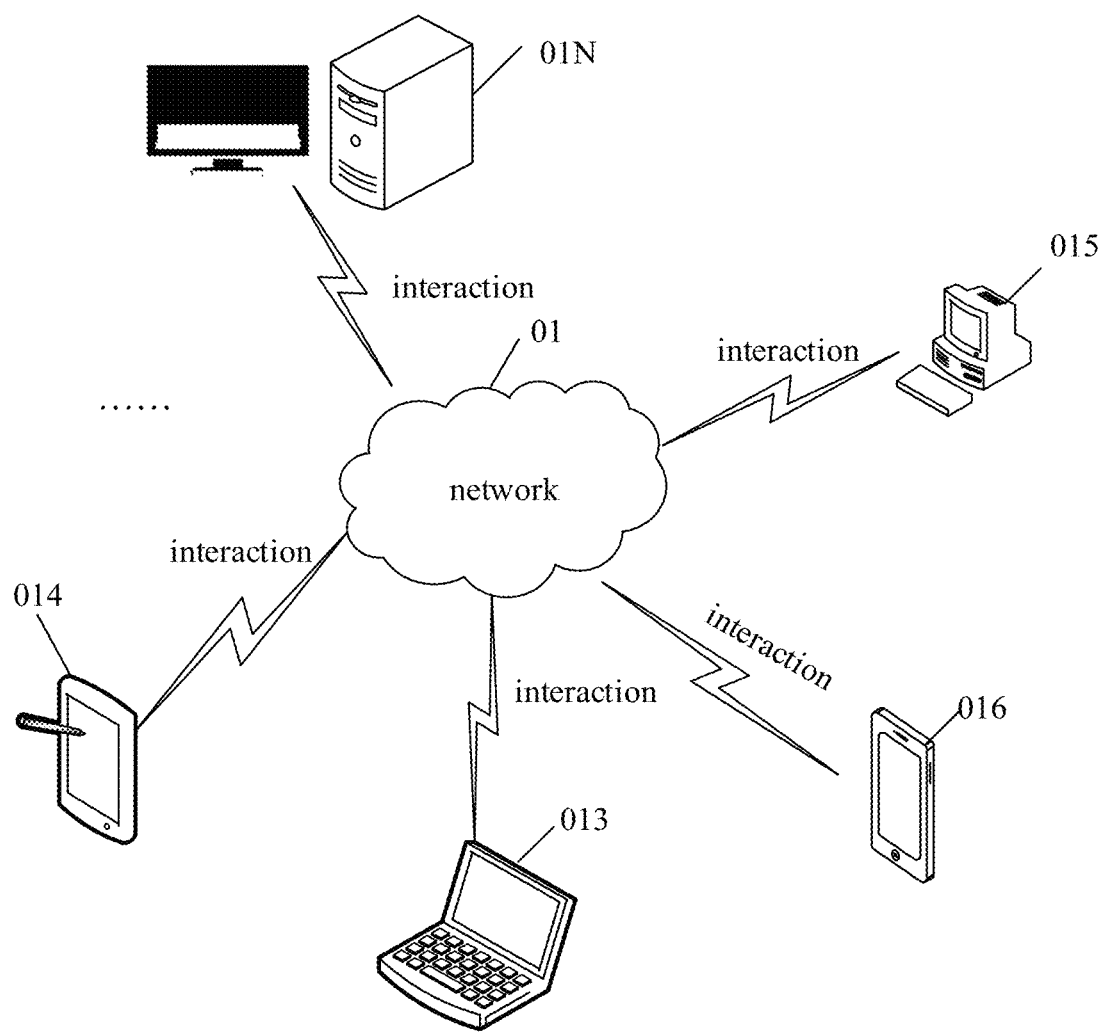
FIG. 3 is a schematic structural diagram of a video coding network architecture provided in implementations of the disclosure.

Taking inter prediction as an example, implementations of the disclosure provide a network architecture of a video coding system including an illumination compensation method. FIG. 3 is a schematic structural diagram of a video coding network architecture of implementations of the disclosure. As illustrated in FIG. 3, the network architecture includes one or more electronic devices 013 to 01N and a communication network 01, where the electronic devices 013 to 01N can perform video interaction through the communication network 01. The electronic device may be various types of devices having video encoding and decoding functions during implementation. For example, the electronic device may include a mobile phone, a tablet computer, a personal computer, a personal digital assistant, a navigator, a digital phone, a video phone, a television, a sensing device, a server, etc. The implementations of the disclosure are not limited. The illumination compensation device in the implementations of the disclosure can be the electronic device.

The electronic device in the implementations of the disclosure has a video encoding and decoding function, generally including a video encoder (i.e., an encoder) and a video decoder (i.e., a decoder).

The disclosure provides a video encoding system. As illustrated in FIG. 4, the video encoding system 100 includes: a transformation unit 111, a quantization unit 112, a mode selection and encoding control logic unit 113, an intra prediction unit 114, an inter prediction unit 115 (including motion compensation and motion estimation), an inverse quantization unit 116, an inverse transformation unit 117, a loop filter unit 118, a coding unit 119, and a decoded picture buffer unit 110. For an input original video signal, a video reconstruction block can be obtained by partitioning a coding tree unit (CTU), an encoding mode is determined by the mode selection and encoding control logic unit 113, and then for residual sample information obtained after intra or inter prediction, the video reconstruction block is transformed by the transformation unit 111 and the quantization unit 112, including transforming the residual information from a pixel domain to a transformation domain, and the obtained transformation coefficients are quantized, to further reduce the bit rate. The intra prediction unit 114 performs intra prediction on the video reconstruction block. The intra prediction unit 114 is used to determine an optimal intra prediction mode (i.e., a target prediction mode) of the video reconstruction block. The inter prediction unit 115 is used to perform inter predictive coding on the received video reconstruction block with respect to one or more blocks in the one or more reference frames, to provide temporal prediction information. The motion estimation is a process of generating a motion vector, where the motion vector can estimate motion of the video reconstruction block, and motion compensation is performed based on the motion vector determined by the motion estimation. After determining the inter prediction mode, the inter prediction unit 115 is further used to provide the selected inter prediction data to the coding unit 119, and also to send the determined motion vector data to the coding unit 119. In addition, the inverse quantization unit 116 and the inverse transformation unit 117 are used for reconstruction of the video reconstruction block. The residual block is reconstructed in the pixel domain, the blocking artifacts of the reconstructed residual block are removed by the loop filter unit 118, and then the reconstructed residual block is added to a predictive block in the frame of the decoded picture buffer unit 110, to generate the reconstructed video reconstruction block. The coding unit 119 is used to encode various encoding parameters and quantized transformation coefficients. The decoded picture buffer unit 110 is used to store the reconstructed video reconstruction block, for prediction reference. As the video picture encoding proceeds, a new reconstructed video reconstruction block is continuously generated and all these reconstructed video reconstruction blocks are stored into the decoded picture buffer unit 110.

Figure 5:
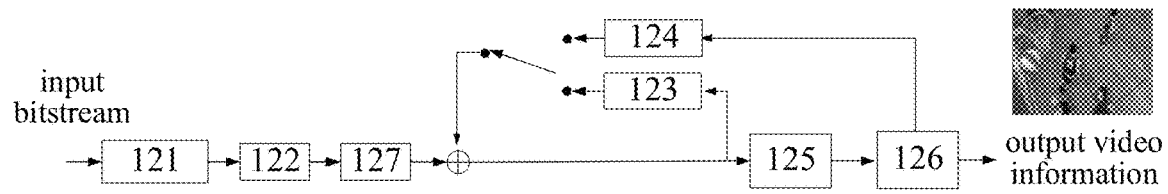
FIG. 5 is a schematic structural diagram of a video decoding system provided in implementations of the disclosure.

Implementations of the disclosure provide a video decoding system. FIG. 5 is a schematic structural diagram of a video decoding system of implementations of the disclosure. As illustrated in FIG. 5, the video decoding system 120 includes: a coding unit 121, an inverse transformation unit 127, an inverse quantization unit 122, an intra prediction unit 123, a motion compensation unit 124, a loop filter unit 125, and a decoded picture buffer unit 126. After the input video signal is encoded by the video encoding system 100, a bitstream of the video signal is output. The bitstream is input into the video decoding system 120, and through the coding unit 121, decoded transformation coefficients can be obtained. The transformation coefficients are processed by the inverse transformation unit 127 and the inverse quantization unit 122, to generate a residual block in the pixel domain. The intra prediction unit 123 may be used to generate prediction data for the current video decoding block based on the determined intra prediction direction and data from the previously decoded block of the current frame or picture. The motion compensation unit 124 determines prediction information for the video decoding block by parsing the motion vector and other associated syntax elements and uses the prediction information to generate a predictive block of the video decoding block being decoded. A decoded video block is formed by adding the residual block from the inverse transformation unit 127 and the inverse quantization unit 122 to the corresponding predictive block generated by the intra prediction unit 123 or the motion compensation unit 124. The blocking artifacts of the decoded video signal can be removed through the loop filter unit 125, which can improve video quality. The decoded video block is then stored in the decoded picture buffer unit 126. The decoded picture buffer unit 126 stores a reference picture for subsequent intra prediction or motion compensation, and is also for output of the video signal, resulting in a restored original video signal.

In the practical application, there are often changes in illumination intensity of video content in real natural videos, such as the decrease of illumination intensity over time, the obstruction of dark clouds or the change of flash intensity of the camera. The difference between previous and subsequent frames in these video contents mainly lies in the strength of the DC component of the picture, but there is basically no change in the texture information in the content. However, due to the influence of large DC component value, motion search and motion compensation for inter prediction technology is unable to effectively predict these contents, and it is easy to encode more residual information. Illumination compensation (IC) technology can remove these DC redundant information, and accurately predict luma changes and make corresponding compensation, which makes residual information smaller and improves coding efficiency.

In the related technologies, the illumination compensation technology includes multifunctional video coding, the technology carried in JEM of H.266 (versatile video coding, VVC) and the illumination compensation technology specified in audio video coding standard (AVS) 3 at present are as follows.

Figure 6:
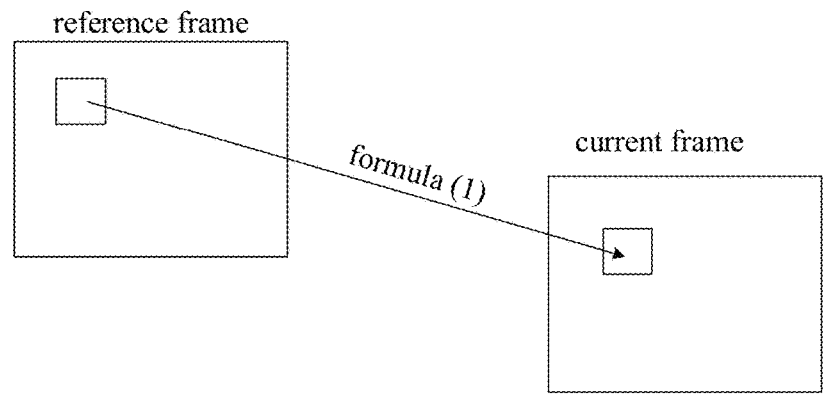
FIG. 6 is a schematic diagram of illumination compensation of a current block and a reference block provided in implementations of the disclosure.

In the inter prediction mode, for each CU block that can use the illumination compensation technology, rate distortion costs (Rdcost) with and without the illumination compensation technology used are calculated and compared. The illumination compensation technology is mainly achieved by linearly compensating the prediction block through a linear illumination compensation model. The illumination compensation model is mainly composed of a scaling factor a and an offset factor b, and the specific formula is illustrated in formula (1):

$$\text{Pred}'(x,y) = a \cdot \text{Pred}(x,y) + b \quad (1)$$

where Pred(x, y) is a prediction block before illumination compensation and Pred'(x, y) is a prediction block after illumination compensation, a is a scaling factor in the illumination compensation model, and b is an offset factor in the illumination compensation model. In the process of digital video encoding and decoding, as illustrated in FIG. 6, according to the reconstructed reference block of the reference frame, the illumination difference of the coding block (i.e., the current block)

of the current frame is modified/refined by the illumination compensation model, to obtain the compensated prediction block.

It should be noted that, both a and b need to be calculated through the picture information of the current frame and the picture information of the reference frame, and are obtained by modeling the spatial neighbouring reconstructed samples of the current block and the corresponding neighbouring reference samples of the reconstructed block in the reference frame. The derivation formula is illustrated in formula (2):

$$\text{Curr\_Rec}_{neigh} = a \cdot \text{Ref\_Rec}_{neigh} + b \tag{2}$$

where $\text{Curr\_Rec}_{neigh}$ is the reconstructed sample of the reconstructed picture of the current frame, and $\text{Ref\_Rec}_{neigh}$ is the reconstructed reference sample of the reconstructed picture of the reference frame.

In implementations of the disclosure, the scaling factor a and the offset factor b are calculated with the corresponding neighbouring reconstructed reference samples of the reconstructed reference block in the reference frame and the neighbouring reconstructed samples of the coding block in the current frame. According to the correlation between the neighbouring reconstructed samples of the coding block of the current frame and the reconstructed reference samples at the same corresponding sample positions in the reference frame, by modeling and solving formula (2), the illumination compensated prediction block corresponding to the current block can be obtained.

Figure 7A:
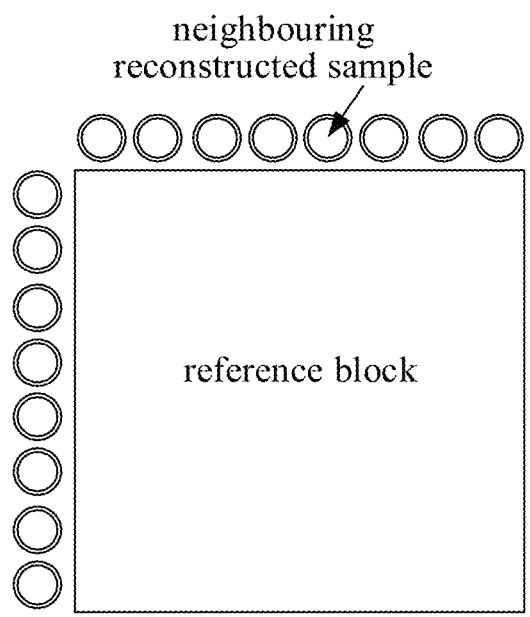
FIG. 7A is schematic diagram 1 of arrangement of a current block and a reference block provided in implementations of the disclosure.
Figure 7B:
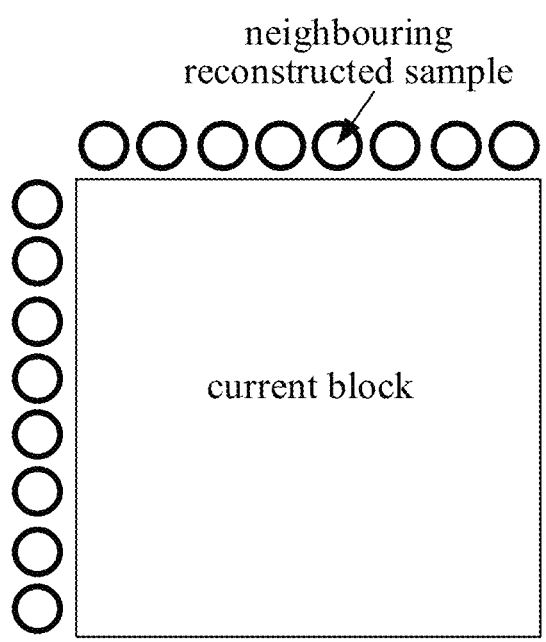
FIG. 7B is schematic diagram 2 of arrangement of a current block and a reference block provided in implementations of the disclosure.

For example, as illustrated in FIG. 7A and FIG. 7B, the reconstructed samples are the most neighbouring reconstructed samples of CU, the reference picture CU is the corresponding reconstructed CU (reference block) in the reference frame, and the current picture CU is the CU to-be-encoded (current block) in the current frame. By modeling the corresponding reconstructed samples in two frames and solving the linear relationship, the scaling factor a and the offset factor b are obtained, and then the linear relationship is applied to the reference picture CU to obtain the prediction block of the current picture CU. Specifically, the neighbouring reconstructed samples of the reference picture CU are sorted, and to avoid some noises from affecting the accuracy of the linear model, a maximum value and a minimum value after sorting are removed. The average value of the two larger values of the reconstructed samples after sorting is calculated and recorded as Max1, and the average value of the two smaller values of the reconstructed samples after sorting is calculated and recorded as Min1. In addition, the average value of the reconstructed samples of the current picture CU corresponding to the two larger coordinates taken after sorting is calculated and recorded as Max2, and the average value of the reconstructed samples of the current picture CU corresponding to the two smaller coordinates taken after sorting is calculated and recorded as Min2. Formula (3) and formula (4) are derived by solving the linear model.

$$a = \frac{\text{Max2} - \text{Min2}}{\text{Max1} - \text{Min1}} \tag{3}$$

$$b = a \times \text{Min2} - \text{Min1} \tag{4}$$

In implementations of the disclosure, Max1, Max2, Min1, and Min2 are substituted into formulas (3) and (4) to calculate a and b.

The illumination compensation technology in the implementations of the disclosure is applied to the inter prediction part in the video encoding hybrid frame, specifically applied to all prediction modes of the inter prediction, and acts on both the encoder and the decoder.

An encoder employing an inter prediction IC technology in an inter prediction encoding mode is implemented as follows.

The input digital video information is partitioned into several coding tree units at the encoder, each coding tree unit is partitioned into several rectangular or square coding units (i.e., current blocks), and inter prediction is respectively performed on each coding unit to calculate prediction blocks.

In the current coding unit, if the illumination compensation enabled flag is '1', all the following steps are performed, and if the illumination compensation enabled flag is '0', only steps a), b), and f) are performed.

a) For inter prediction, all candidate MVs are firstly traversed and motion compensation is performed, the prediction sample after motion compensation under each MV is calculated, and the rate distortion cost is calculated according to the original sample and the prediction sample.

b) The prediction mode (such as SKIP, MERGE/DIRECT, or INTER) and the optimal MV of the current coding unit are selected according to the principle of determining the minimum one of rate distortion costs of all MVs, and the optimal information and the corresponding rate distortion cost information are recorded.

c) All candidate MVs are traversed again, and in this process, the illumination compensation technology is used. The reference block (reconstructed samples of the reference frame) is first matched and fetched according to the prediction mode and MV, left and top reconstructed samples of the reference block and left and top reconstructed samples of the current coding unit are extracted, then the samples are sorted, averaged (the specific operation is described as above), and substituted into the above formula, to obtain linear model parameters a and b.

d) Motion compensation is performed on the reference block, the prediction block after normal motion compensation is obtained, then illumination compensation is performed on the prediction block, that is, performing linear transform on the samples in each prediction block according to the linear model, and the final prediction block of the current coding unit is obtained.

e) The rate distortion cost information of each MV is calculated according to the final prediction sample after using the illumination compensation technology and the original sample, and the MV index of the minimum rate distortion cost information and its corresponding prediction mode (such as skip mode, merge/direct mode, or normal inter mode) and its corresponding rate distortion cost are recorded.

f) If the illumination compensation technology enabled flag is '0', the MV index and prediction mode recorded in b) are transmitted to the decoder via the bitstream. If the illumination compensation technology enabled flag is '1', the minimum cost value recorded in b) is compared with the minimum cost value recorded in e). If the rate distortion cost in b) is smaller, the MV index and prediction mode recorded in b) are encoded as the optimal information of the current coding unit, and are transmitted to the decoder via the bitstream, and the flag position of the illumination compensation technology of the current coding unit is set invalid, indicating that the illumination compensation technology is not used, which is also transmitted to the decoder via the bitstream. If the rate distortion in e) is smaller, the MV index and prediction mode recorded in e) are encoded as the optimal information of the current coding unit, and are transmitted to the decoder via the bitstream, and the flag position of the illumination compensation technology of the current coding unit is set valid, indicating that the illumination compensation technology is used, which is also transmitted to the decoder via the bitstream.

A decoder employing the IC in the inter prediction encoding mode is implemented as follows.

The decoder obtains and parses the bitstream to obtain the digital video sequence information, the illumination compensation enabled flag, the encoding mode of the current coding unit (i.e., the current block), and the illumination compensation usage flag of the current coding unit.

In the current coding unit, if the illumination compensation enabled flag is '1', all the following steps are performed; and if the illumination compensation enabled flag is '0', only steps a), b), d), and f) are performed.

a) The bitstream information is obtained, residual information of current coding unit is parsed out, and then inverse transform and inverse quantization are performed to get pixel-domain residuals.

b) The bitstream is parsed to obtain the prediction mode information and the MV index of the current coding unit.

c) The bitstream is parsed to obtain the usage flag of the illumination compensation technology.

d) The reference block in the reference frame is obtained according to the prediction mode and the MV index of the current coding unit, and after motion compensation, the prediction block of the current coding unit is obtained.

e) If the usage flag of the illumination compensation technology of the current coding unit is '1', the left and top reconstructed samples of the reference block in the reference frame are obtained, the left and top reconstructed samples of the current coding unit are obtained, the obtained reconstructed samples of the reference frame and the current frame are sorted and averaged (the specific operation is described above), and the scaling factor a and the offset factor b of the linear model are obtained by computing the formula described above. The prediction block of the current coding unit is linear transformed, to obtain the final prediction block of the current coding unit.

f) The prediction block is added to the restored residual information, to obtain the reconstructed block of the current coding unit, and the reconstructed block is output after post-processing.

It should be noted that, the illumination compensation enabled flag in the implementations of the disclosure is the numerical representation form of the illumination compensation enabled flag, and the illumination compensation usage flag is the numerical representation form of the illumination compensation usage flag.

In implementations of the disclosure, for the illumination compensation technology, when calculating the linear model, the illumination compensation technology only has a good prediction compensation effect on a specific video sequence, such as the flash lamp action picture taken by a mobile phone or a camera, the headlight change picture of a motor vehicle passing by at night, etc. In this case, the illumination compensation technology can minimize the difference between the prediction value and the actual sample value. However, for non-illumination compensation video sequences, such as normal natural video, the illumination compensation technology is unable to play a good role in prediction compensation, and due to the overhead of flags at the coding unit level, the bit rate of the bitstream will increase. Therefore, for a specific illumination video or picture, the codec needs to adaptively enable or disable the illumination compensation technology from the enabled flag at the frame level, to save bit overhead and improve compression efficiency.

Based on this, when performing inter prediction, the disclosure is applied to the current block, and the illumination compensation method provided in implementations of the disclosure is mainly applied to the inter prediction unit 115 of the video encoding system 100 and the inter prediction unit of the video decoding system 120, i.e., the motion compensation unit 124. That is, if a better prediction effect can be obtained in the video encoding system 100 with the illumination compensation method provided in the implementations of the disclosure, correspondingly, the video decoding quality can be improved at the decoder.

Based on this, the technical solutions of the disclosure are further described in detail with reference to the drawings and implementations. Before elaboration, it should be noted that the "first", "second", and "third" mentioned throughout the specification are merely for distinguishing different features, and do not have the functions of limiting priority, order, and size.

Implementations of the disclosure provide an illumination compensation method, which is applied to a video decoding device, i.e., a decoder. The functions of the method can be achieved by invoking program codes by a first processor in the video decoding device, and the program codes can be stored in a computer storage medium. It can be seen that the video decoding device at least includes the first processor and a first storage medium. The current coding unit and the current coding unit are both represented by the current block below.

Figure 8:
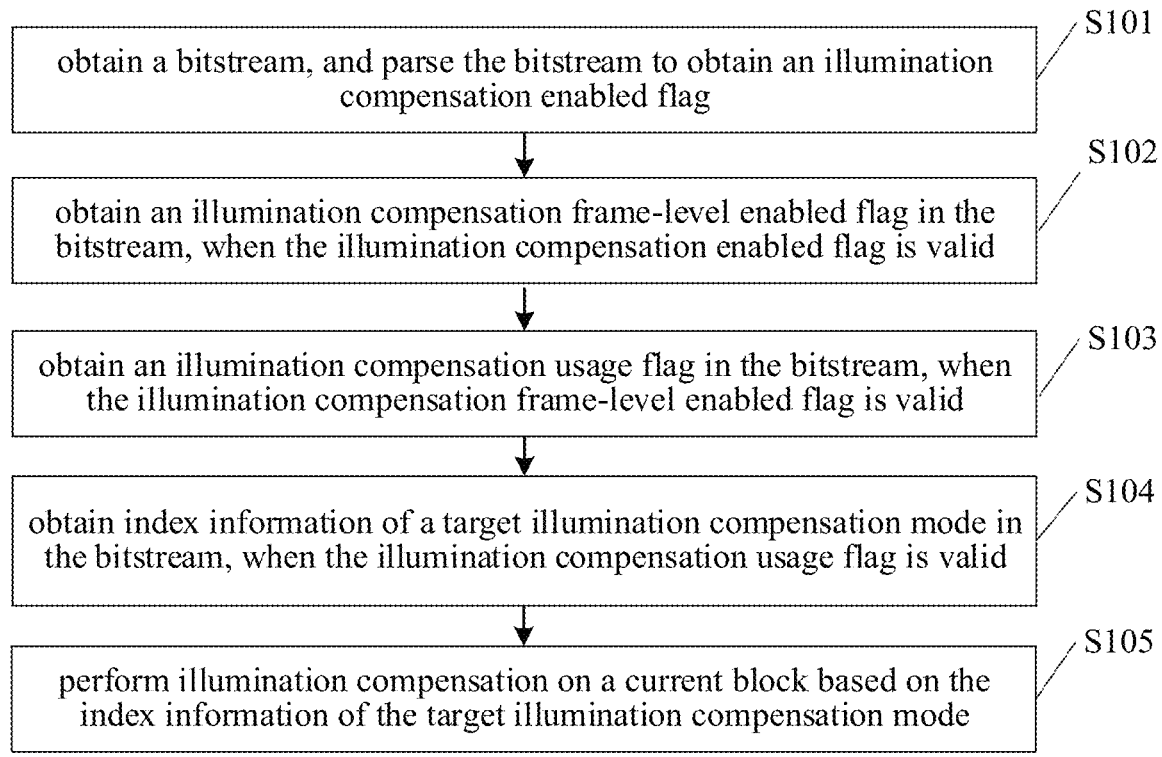
FIG. 8 is a flowchart of an illumination compensation method provided in implementations of the disclosure.

FIG. 8 is a schematic flowchart of an illumination compensation method of implementations of the disclosure. As illustrated in FIG. 8, the method includes the following.

S101, a bitstream is obtained, and the bitstream is parsed to obtain an illumination compensation enabled flag.

S102, an illumination compensation frame-level enabled flag in the bitstream is obtained, when the illumination compensation enabled flag is valid.

S103, an illumination compensation usage flag in the bitstream is obtained, when the illumination compensation frame-level enabled flag is valid.

S104, index information of a target illumination compensation mode in the bitstream is obtained, when the illumination compensation usage flag is valid.

S105, illumination compensation is performed on a current block based on the index information of the target illumination compensation mode.

The illumination compensation method provided in implementations of the disclosure can be combined with various application scenarios of the prediction technology, such as inter prediction, inter non-rectangular prediction, affine transformation prediction, etc. The implementations of the disclosure are not limited.

In implementations of the disclosure, after obtaining the bitstream, the decoder can first determine whether the illumination compensation is allowed in the video sequence to-be-parsed from header information of the bitstream, that is, it can parse out the illumination compensation enabled flag, which is an indication of whether the illumination compensation is allowed in the video sequence.

It should be noted that, in implementations of the disclosure, if the illumination compensation enabled flag parsed out by the decoder is valid, indicating that the illumination compensation function is allowed to be enabled in the video sequence, then the bitstream obtained by the decoder must have the illumination compensation frame-level enabled flag at the frame level further indicating whether each frame allows illumination compensation, that is, the decoder can also parse out the illumination compensation frame-level enabled flag in the bitstream. When the illumination compensation frame-level enabled flag corresponding to a certain frame (such as the current frame) in the video sequence is valid, indicating that the illumination compensation function is allowed to be enabled in the frame, then the decoder needs to further parse and confirm the block in the frame for which the illumination compensation technology is used. When decoding the current block, the decoder can determine whether the illumination compensation technology is used for the current block through the block-level illumination compensation usage flag, for subsequent decoding process. If the illumination compensation usage flag corresponding to the current block is valid, the illumination compensation technology is used when the current block is encoded. Therefore, in parsing, the decoder can obtain the index information of the target illumination compensation mode used in encoding the current block, which is transmitted in the bitstream, so that the decoder can perform illumination compensation on the current block with the index information of the target illumination compensation mode.

In implementations of the disclosure, when the decoder knows that the IC technology is used, the illumination compensation enabled flag is valid (where the value of the illumination compensation enabled flag of the illumination compensation enabled flag represents valid or not). In this case, when the decoder knows that the video sequence to which the current block belongs can use the IC technology, it needs to further determine whether the illumination compensation frame-level enabled flag corresponding to the current frame to which the current block belongs is valid from the bitstream, and if valid, it indicates that the current block is allowed to use illumination compensation. Then, the decoder needs to further determine whether the illumination compensation usage flag corresponding to the current block is valid from the bitstream, if valid, it indicates that illumination compensation is used for the current block, and if invalid, it indicates that the current block is allowed to use illumination compensation technology but illumination compensation is not used for the current block. In implementations of the disclosure, if the illumination compensation is used in encoding, the decoder can obtain the used index information of the target illumination compensation mode from the bitstream.

Exemplarily, the decoder can also parse out the current prediction mode and the current motion information used by the encoder. According to the index information of the target illumination compensation mode, the current prediction mode, and the current motion information, the decoder performs inter prediction on the current block, to obtain the prediction value, and then performs the subsequent decoding process based on the prediction value.

It should be noted that in the implementation of the disclosure, the flag can be represented by a numerical value, which is not limited in implementations of the disclosure.

Exemplarily, the illumination compensation enabled flag is '1', which indicates that the illumination compensation enabled flag is valid. The illumination compensation enabled flag is '0', which indicates that the illumination compensation enabled flag is invalid. The illumination compensation frame-level enabled flag is '1', which indicates that the illumination compensation frame-level enabled flag is valid. The illumination compensation frame-level enabled flag is '0', which indicates that the illumination compensation frame-level enabled flag is invalid. The illumination compensation usage flag is '1', which indicates that the illumination compensation usage flag is valid. The illumination compensation usage flag is '0', which indicates that the illumination compensation usage flag is invalid.

Alternatively, the illumination compensation enabled flag is '0', which indicates that the illumination compensation enabled flag is valid. The illumination compensation enabled flag is '1', which indicates that the illumination compensation enabled flag is invalid. The illumination compensation frame-level enabled flag is '0', which indicates that the illumination compensation frame-level enabled flag is valid. The illumination compensation frame-level enabled flag is '1', which indicates that the illumination compensation frame-level enabled flag is invalid. The illumination compensation usage flag is '0', which indicates that the illumination compensation usage flag is valid. The illumination compensation usage flag is '1', which indicates that the illumination compensation usage flag is invalid, which is not limited in implementations of the disclosure.

In some implementations of the disclosure, the illumination compensation frame-level enabled flag includes at least one illumination compensation frame-level enabled flag. That is, in implementations of the disclosure, one illumination compensation enabled flag at the frame level indicates that the illumination compensation technology is enabled for the current picture to-be-encoded (i.e., the current frame), or multiple illumination compensation enabled flags at the frame level indicate that the illumination compensation technology is enabled for the current picture to-be-encoded.

In implementations of the disclosure, the at least one illumination compensation frame-level enabled flag is in one-to-one correspondence with different prediction modes of a current frame, or the at least one illumination compensation frame-level enabled flag is in one-to-one correspondence with different regions of the current frame. That is, for different prediction modes or different picture regions of one frame, different illumination compensation frame-level enabled flags can be used.

In some implementations of the disclosure, the illumination compensation frame-level enabled flag includes N levels of illumination compensation frame-level enabled flags corresponding to prediction modes. In this case, the decoder obtains the illumination compensation usage flag in the bitstream as follows, when the illumination compensation frame-level enabled flag is valid. When an i-th level of illumination compensation frame-level enabled flag in the N levels of illumination compensation frame-level enabled flags is valid, an (i+1)-th level of illumination compensation frame-level enabled flag in the bitstream is determined until an N-th level of illumination compensation frame-level enabled flag in the bitstream is determined, where i is a positive integer greater than or equal to 1 and less than or equal to N, and N is a positive integer greater than or equal to 1; and when the (i+1)-th level of illumination compensation frame-level enabled flag is invalid, the illumination compensation usage flag in the bitstream is obtained.

It should be noted that, the decoder can sequentially parse the bitstream according to the order of the N levels of illumination compensation frame-level enabled flags. There is a priority relationship in the N levels of illumination compensation frame-level enabled flags, and the priorities of the first level of illumination compensation frame-level enabled flag to the N-th level of illumination compensation frame-level enabled flag are decreasing, where the first level illumination compensation frame-level enabled flag has the highest priority. In this case, when the decoder decodes the illumination compensation frame-level enabled flag with high priority, the decoder can continue to parse out the subsequent illumination compensation frame-level enabled flags according to the priority when the illumination compensation frame-level enabled flag with high priority is valid. That is, when the illumination compensation frame-level enabled flag with high priority is determined to be invalid, the subsequent level of illumination compensation frame-level enabled flag is not parsed out.

In implementations of the disclosure, if the illumination compensation technology can be combined with some prediction modes corresponding to the current frame, the first level of illumination compensation frame-level enabled flag indicates that the illumination compensation technology can be combined with the current frame but the illumination compensation technology is not enabled for all prediction modes, the subsequent illumination compensation frame-level enabled flag needs to be obtained, and the illumination compensation technology is enabled for the corresponding prediction mode at the encoder and decoder according to the bitstream syntax. If the illumination compensation technology is not enabled in the current frame, the first level of illumination compensation frame-level enabled flag is 'no', and the subsequent flag does not need to be obtained and no code word of the subsequent flag exists in the bitstream.

It should be noted that, if the i-th level of illumination compensation frame-level enabled flag in the N levels of illumination compensation frame-level enabled flags is valid, the (i+1)-th level of illumination compensation frame-level enabled flag in the bitstream is determined, and if the (i+1)-th level of illumination compensation frame-level enabled flag is still valid, the next level is continued to be determined, but if the N-th level of illumination compensation frame-level enabled flag is still valid, the next level is no longer determined because there is no next level. In this process, if the (i+1)-th level of illumination compensation frame-level enabled flag is invalid, the next level is no longer continued to be determined, but the illumination compensation technology is enabled for the prediction mode corresponding to the i-th level of illumination compensation frame-level enabled flag, and illumination compensation is used for which current block is determined, to obtain the illumination compensation usage flag in the bitstream. In some implementations of the disclosure, if the first level of illumination compensation frame-level enabled flag is invalid, illumination compensation technology is enabled for none of the prediction modes of the current frame and thus no illumination compensation is required.

In some implementations of the disclosure, the decoder can also directly parse out all the N levels of illumination compensation frame-level enabled flags from the bitstream, which have no priority relationship. If any level of illumination compensation frame-level enabled flag is valid, the illumination compensation mode is enabled for the prediction mode corresponding to that level of illumination compensation frame-level enabled flag, and the illumination compensation usage flag can be continued to be determined. If invalid, it is indicated that the illumination compensation mode is not enabled for the prediction mode corresponding to that level of illumination compensation frame-level enabled flag, and normal decoding can be performed.

In some implementations of the disclosure, the prediction mode may include a merge mode/direct mode, a skip mode, a normal inter mode, and the like, and are not limited by implementations of the disclosure.

Exemplarily, when N=3, the first level of illumination compensation frame-level enabled flag corresponds to the merge mode/direct mode, a second level of illumination compensation frame-level enabled flag corresponds to the skip mode, and a third level of illumination compensation frame-level enabled flag corresponds to the normal inter mode.

Understandably, the decoder can determine, according to different prediction modes, a prediction mode(s) for which the illumination compensation technology is enabled and a prediction mode(s) for which the illumination compensation technology is not enabled, and then can filter out in the frame-level a part of code words of the current frame with the illumination compensation technology disabled, thereby improving the efficiency of uncompressing.

In some implementations of the disclosure, the decoder may also obtain a picture region partition flag when parsing the bitstream, obtain the M illumination compensation frame-level enabled flags, when the picture region partition flag is valid, and skip illumination compensation, when the picture region partition flag is invalid, where M is a positive integer greater than or equal to 1.

It should be noted that, the decoder can set different illumination compensation frame-level enabled flags for different picture regions of the current frame. In implementations of the disclosure, the current frame is partitioned into M picture regions.

In some implementations of the disclosure, the illumination compensation frame-level enabled flag includes M illumination compensation frame-level enabled flags corresponding to picture regions. In this case, the decoder obtains the illumination compensation usage flag in the bitstream as follows, when the illumination compensation frame-level enabled flag is valid. When a j-th illumination compensation frame-level enabled flag in the M illumination compensation frame-level enabled flags is valid, a (j+1)-th illumination compensation frame-level enabled flag in the bitstream is determined until an M-th illumination compensation frame-level enabled flag in the bitstream is determined, where j is a positive integer greater than or equal to 1 and less than or equal to M, and M is a positive integer greater than or equal to 1; and when the (j+1)-th illumination compensation frame-level enabled flag is invalid, the illumination compensation usage flag in the bitstream is obtained.

It should be noted that, the decoder can sequentially parse the bitstream according to the order of the M illumination compensation frame-level enabled flags. There is a priority relationship in the M illumination compensation frame-level enabled flags, and the priorities of the first illumination compensation frame-level enabled flag to the M-th illumination compensation frame-level enabled flag are decreasing, where the first illumination compensation frame-level enabled flag has the highest priority. In this case, when the decoder decodes the illumination compensation frame-level enabled flag with high priority, the decoder can continue to parse out the subsequent illumination compensation frame-level enabled flags according to the priority when the illumination compensation frame-level enabled flag with high priority is valid. That is, when the illumination compensation frame-level enabled flag with high priority is determined to be invalid, the subsequent illumination compensation frame-level enabled flag is not parsed out.

In implementations of the disclosure, if the illumination compensation technology can be combined with some picture regions corresponding to the current frame, the first illumination compensation frame-level enabled flag indicates that the illumination compensation technology can be combined with the first picture region of the current frame but the illumination compensation technology is not enabled for all picture regions, the subsequent illumination compensation frame-level enabled flag needs to be obtained, and the illumination compensation technology is enabled for the corresponding picture region at the encoder and decoder according to the bitstream syntax. If the illumination compensation technology is not enabled in the first picture region of the current frame, the first illumination compensation frame-level enabled flag is 'no', and the subsequent flag does not need to be obtained and no code word of the subsequent flag exists in the bitstream, that is, the illumination compensation technology is disabled for all the picture regions of the current frame.

It should be noted that, if the i-th illumination compensation frame-level enabled flag in the M illumination compensation frame-level enabled flags is valid, the (i+1)-th illumination compensation frame-level enabled flag in the bitstream is determined, and if the (i+1)-th illumination compensation frame-level enabled flag is still valid, the next one is continued to be determined, but if the M-th illumination compensation frame-level enabled flag is still valid, the next one is no longer determined because there is no next one. In this process, if the (i+1)-th illumination compensation frame-level enabled flag is invalid, the next one is no longer continued to be determined, but the illumination compensation technology is enabled for the picture region corresponding to the i-th illumination compensation frame-level enabled flag, and illumination compensation is used for which current block is determined, to obtain the illumination compensation usage flag in the bitstream. In some implementations of the disclosure, if the first illumination compensation frame-level enabled flag is invalid, the illumination compensation technology is enabled for none of the picture regions of the current frame and thus no illumination compensation is required.

In some implementations of the disclosure, the illumination compensation frame-level enabled flag includes M illumination compensation frame-level enabled flags corresponding to picture regions. In this case, the decoder obtains the illumination compensation usage flag in the bitstream as follows, when the illumination compensation frame-level enabled flag is valid. The illumination compensation usage flag in the bitstream is obtained, when any one of the M illumination compensation frame-level enabled flags is valid.

In some implementations of the disclosure, the decoder can also directly parse out all the M illumination compensation frame-level enabled flags from the bitstream, which have no priority relationship. If any illumination compensation frame-level enabled flag is valid, it is indicated that the illumination compensation mode is enabled in the picture region corresponding to that illumination compensation frame-level enabled flag, and the illumination compensation usage flag can be continued to be determined. If invalid, it is indicated that the illumination compensation mode is not enabled in the picture region corresponding to that illumination compensation frame-level enabled flag, and normal decoding can be performed.

In some implementations of the disclosure, illumination compensation is skipped or not performed if the first illumination compensation frame-level enabled flag is invalid.

Understandably, the decoder can determine, according to different picture regions of the current frame, picture regions the illumination compensation technology is enabled for and picture regions the illumination compensation technology is not enabled for, and then can filter out from the frame level a part of code words of the picture regions with the illumination compensation technology disabled, thereby improving the efficiency of uncompressing.

In some implementations of the disclosure, on the premise that the illumination compensation function or illumination compensation technology is enabled for the current frame, when decoding the current block, the decoder can directly decode the current block, or partition the current block to obtain at least two sub-blocks corresponding to at least two regions and decode the at least two sub-blocks sequentially. Implementations of the disclosure are not limited.

In some implementations of the disclosure, the decoder can perform illumination compensation on the current block based on the index information of the target illumination compensation mode as follows. For the at least two sub-blocks, reconstructed samples of a current frame and reconstructed reference samples of a reference frame are determined based on the index information of the target illumination compensation mode. An h-th model parameter corresponding to an h-th region is determined based on the reconstructed samples of the current frame and the reconstructed reference samples of the reference frame, where h is a positive integer greater than or equal to 1 and less than the number of the at least two sub-blocks. Illumination compensation is performed on the h-th region based on the h-th model parameter, to obtain an h-th region prediction block. Illumination compensation is performed on an (h+1)-th region until illumination compensation on the at least two sub-blocks is completed.

It should be noted that, in implementations of the disclosure, there may be three illumination compensation modes: a top-left illumination compensation mode (IC_TL), a top illumination compensation mode (IC_T), and a left illumination compensation mode (IC_L). The index information of the target illumination compensation mode corresponds to one of the top-left illumination compensation mode (IC_TL), the top illumination compensation mode (IC_T), and the left illumination compensation mode (IC_L). The top-left illumination compensation mode, the top illumination compensation mode, and the left illumination compensation mode are determined by samples of neighbouring edges at different positions.

According to the index information of the target illumination compensation mode, the decoder can determine the illumination compensation mode, so that the neighbouring edges used in this illumination compensation mode can be determined, to determine the reconstructed samples of the current frame and the reconstructed reference samples of the reference frame. Each sub-block is sequentially subjected to illumination compensation at least based on the reconstructed samples of the current frame and the reconstructed reference samples of the reference frame.

In implementations of the disclosure, the at least two sub-blocks can have a processing order, for example, the sub-block in the top-left region is processed first, the sub-block in the top-right region is then processed, and then the sub-block in the bottom-right region is processed, etc. Implementations of the disclosure are not limited. The decoder can determine the h-th model parameter corresponding to the h-th region according to the reconstructed samples of the current frame and the reconstructed reference samples of the reference frame, construct the h-th target illumination compensation mode corresponding to the h-th region with the h-th model parameter, and perform illumination compensation on the h-th region by using the h-th target illumination compensation mode, to obtain the illumination prediction value of the h-th region prediction block of the h-th region. Continue to perform illumination compensation on the next region until illumination compensation on the at least two sub-blocks is completed.

Understandably, in the process of decoding the current block, on the premise of performing the illumination compensation function on the current block (i.e., when the illumination compensation usage flag of the current block is valid), the decoder can perform block region partition on the current block, to obtain the at least two sub-blocks, calculate the target illumination compensation mode corresponding to each sub-block, and then perform illumination compensation based on the respective target illumination compensation mode. As such, the target illumination compensation mode is determined for each sub-block, and corresponding processing can be performed on different sub-blocks, thereby improving the decoding accuracy and the decoding performance.

It should be noted that when the decoder calculates the linear model parameters (i.e., model parameters), it can partition the current block into several regions of specified size, and the linear model parameters are calculated respectively and applied to corresponding regions.

In some implementations of the disclosure, the decoder determines the h-th model parameter corresponding to the h-th region based on the reconstructed samples of the current frame and the reconstructed reference samples of the reference frame in at least one of the following manners.

Manner 1

When an h-th neighbouring reconstructed reference sample adjacent to the h-th region exists in the reconstructed reference samples of the reference frame, the h-th model parameter is calculated based on the h-th neighbouring reconstructed reference sample and reconstructed samples of the h-th region in the reconstructed samples of the current frame. When h is not equal to 1 and no reconstructed reference sample adjacent to the h-th region exists in the reconstructed reference samples of the reference frame, the h-th model parameter is calculated based on neighbouring samples in an (h−1)-th region prediction block and the reconstructed samples of the h-th region in the reconstructed samples of the current frame.

It should be noted that the reference samples used by the decoder to calculate the linear model can be the neighbouring reconstructed samples (or neighbouring reconstructed reference samples) corresponding to each region. If there exists no neighbouring reconstructed sample corresponding to the region, the prediction samples (region prediction block) after illumination compensation in the neighbouring region in the block can be used for calculation of the linear model.

Exemplarily, if the current coding unit has a size of 32×32, the current coding unit is partitioned into four 16×16 sample regions, and for each 16×16 sample region, the linear model is calculated and linear compensation is performed.

Manner 2

When h is not equal to 1 and an h-th neighbouring reconstructed reference sample adjacent to the h-th region exists in the reconstructed reference samples of the reference frame, the h-th model parameter is calculated based on the h-th neighbouring reconstructed reference sample, neighbouring samples in a first region prediction block to an (h−1)-th region prediction block, and reconstructed samples of the h-th region in the reconstructed samples of the current frame. When h is not equal to 1 and no reconstructed reference sample adjacent to the h-th region exists in the reconstructed reference samples of the reference frame, the h-th model parameter is calculated based on the neighbouring samples in the first region prediction block to the (h−1)-th region prediction block and the reconstructed samples of the h-th region in the reconstructed samples of the current frame.

It should be noted that, in the illumination compensation technology, when calculating the linear model parameters, the current block can be partitioned into several regions of specified sizes, where pixel inheritance relationship is allowed. When determining the neighbouring reconstructed reference samples in the next region, the neighbouring reconstructed reference samples of the current block or the neighbouring reference samples of the neighbouring sub-block of the current sub-block in the current block (i.e., the samples in the region prediction block of the previous region) can be used. If the current sub-block has neighbouring reconstructed reference samples, the model parameters corresponding to the current sub-block are calculated with the neighbouring reconstructed reference samples, but if the current sub-block has no neighbouring reconstructed reference samples, the model parameters corresponding to the current sub-block are calculated with the samples in the region prediction block of the previous region.

Exemplarily, if the current block has a size of 32×32, the current block is partitioned into four 16×16 sample regions. Assuming that illumination compensation is performed on the top-left 16×16 sample region 1 and then the illumination compensation is performed on the top-right 16×16 sample region 2, the top-right 16×16 sample region can use all prediction samples in and the neighbouring reconstructed samples of the top-left and top-right 16×16 sample regions for calculation of the illumination compensation linear model.

In some implementations of the disclosure, if the current sub-block has neighbouring reconstructed reference samples, the model parameters corresponding to the current sub-block is calculated with the neighbouring reconstructed reference samples and samples of at least one of the region prediction blocks of the previous region. If the current sub-block has no neighbouring reconstructed reference sample, the model parameters corresponding to the current sub-block is calculated with the samples of at least one of the region prediction blocks of the previous region. The number of the at least one region prediction block is not limited, which may be global or local.

It should be noted that, when h is 1, there is no pixel inheritance relationship of the current block. The first model parameter is calculated based on the first neighbouring reconstructed reference sample and the reconstructed samples of the first region among the reconstructed samples of the current frame.

Mode 3

After the decoder determines the h-th model parameter corresponding to the h-th region based on the reconstructed samples of the current frame and the reconstructed reference samples of the reference frame, when h is not equal to 1, at least one of a first model parameter to an (h−1)-th new model parameter is weighted with the h-th model parameter, to obtain an h-th new model parameter, and illumination compensation is performed on the h-th region based on the h-th new model parameter, to obtain the h-th region prediction block.

It should be noted that, in the illumination compensation technology, when calculating the linear model parameters, the current block can be partitioned into several regions of specified sizes, where the inheritance relationship of model parameters is allowed. When calculating the model parameters in the next region, the model parameters can be calculated in manner 1 or manner 2, and then weighted together with at least one of the model parameters calculated in the previous region (which can be model parameters calculated directly in manner 1 and manner 2 or new model parameters obtained by weighting with the previous region), to obtain the final model parameters, that is, the new model parameters.

It should be noted that, if h is 1, the first model parameter is also the first new model parameter.

In implementations of the disclosure, the weight information for weighting can be that: the weight of the model parameter calculated by using the current sub-block is the greatest, and the weight of the model parameter calculated by using the sub-block adjacent to the current sub-block is the second greatest, that is, the weight distribution depends on the relevance degree with the current sub-block, and the more relevant, the greater the weight. The weight distribution is not limited in the implementations of the disclosure.

Exemplarily, if the current block has a size of 32×32, the current block is partitioned into four 16×16 sample regions. When illumination compensation is performed on the top-right 16×16 sample region 2, the information after illumination compensation can be referenced. For example, the top-right 16×16 sample region 2 can reference the linear parameters of the top-left 16×16 sample region 1 after the linear parameters is calculated only with its prediction samples and neighbouring samples. Simply, operations such as weighting can be performed, and new linear model parameters can be obtained and applied to the top-right 16×16 sample region 2 for illumination compensation. When the new model parameters are calculated in the sample region 2, the model parameters a1 and b1 calculated in the sample region 1 are inherited with the parameters a2 and b2 calculated in the sample region 2, and a1 and a2 are weighted to obtain final a of the sample region 2, and b1 and b2 are weighted to obtain final b of the sample region 2.

It should be noted that the model parameters include scaling factor a and offset factor b.

In some implementations of the disclosure, the decoder obtains a block region partition flag, when parsing the bitstream, partitions the current block to obtain the at least two sub-blocks, when the block region partition flag is valid; and calculates a block model parameter of the current block, when the block region partition flag is invalid.

It should be noted that the block region partition flag may be provided, or the block partition can be performed directly by default without transmission of the flag, to reduce code words, which is not limited in implementations of the disclosure.

In implementations of the disclosure, the decoder calculates the linear model parameters not by performing region partition on the current block, but calculates the model parameters as a whole, that is, calculates the block model parameters of the current block (in the case of illumination compensation).

It should be noted that the top-left illumination compensation mode, the top illumination compensation mode, and the left illumination compensation mode are all obtained by the model principle illustrated in formula (1). However, the neighbouring edges of the reconstructed reference samples of the reference frame and the reconstructed samples of the current frame that are used are different in obtaining the model parameters, i.e., the scaling factor and the offset factor, of the top-left illumination compensation mode, the top illumination compensation mode, and the left illumination compensation mode. The top-left illumination compensation mode mainly uses top-neighbour and left-neighbour, the top illumination compensation mode uses top-neighbour, and the left illumination compensation mode uses left-neighbour.

In some implementations of the disclosure, the decoder determines the target illumination compensation mode with the index information of the target illumination compensation mode as follows. According to the index information of the target illumination compensation mode, the decoder determines the reconstructed samples of the current frame and the reconstructed reference samples of the reference frame. Based on the reconstructed samples of the current block of the current frame and the reconstructed reference samples of the reference frame, the model parameters of the target illumination compensation mode are determined, and then the target illumination compensation mode is determined.

In some implementations of the disclosure, the decoder determines the target illumination compensation mode based on the reconstructed samples of the current frame and the reconstructed reference samples of the reference frame as follows.

Based on the top reconstructed samples and the left reconstructed samples of the current block of the current frame and the top reconstructed reference samples and the left reconstructed reference samples of the reference frame at same corresponding sample positions, the target illumination compensation mode is determined to be the top-left illumination compensation mode. Alternatively, based on the top reconstructed samples of the current block of the current frame and the top reconstructed reference samples of the reference frame at same corresponding sample positions, the target illumination compensation mode is determined to be the top illumination compensation mode. Alternatively, based on the left reconstructed samples of the current block of the current frame and the left reconstructed reference samples of the reference frame at same corresponding sample positions, the target illumination compensation mode is determined to be the left illumination compensation mode.

In some implementations of the disclosure, the top reconstructed samples of the current frame include at least one first sample of a neighbouring reconstructed block of a top row of the current block in the current frame. The left reconstructed samples of the current frame include at least one second sample of a neighbouring reconstructed block of a left column of the current block in the current frame. The top reconstructed reference samples of the reference frame include at least one third sample of a neighbouring reconstructed block of a top row of the initial prediction block in the reference frame, or at least one fourth sample of the N-th row in the initial prediction block in the reference frame, where N is a positive integer greater than or equal to 1 and less than the number of rows in the current block. The left reconstructed reference samples of the reference frame include at least one fifth sample of a neighbouring reconstructed block of a left column of the initial prediction block in the reference frame, or at least one sixth sample of the M-th column in the initial prediction block in the reference frame, where M is a positive integer greater than or equal to 1 and less than the number of columns in the current block.

Figure 9:
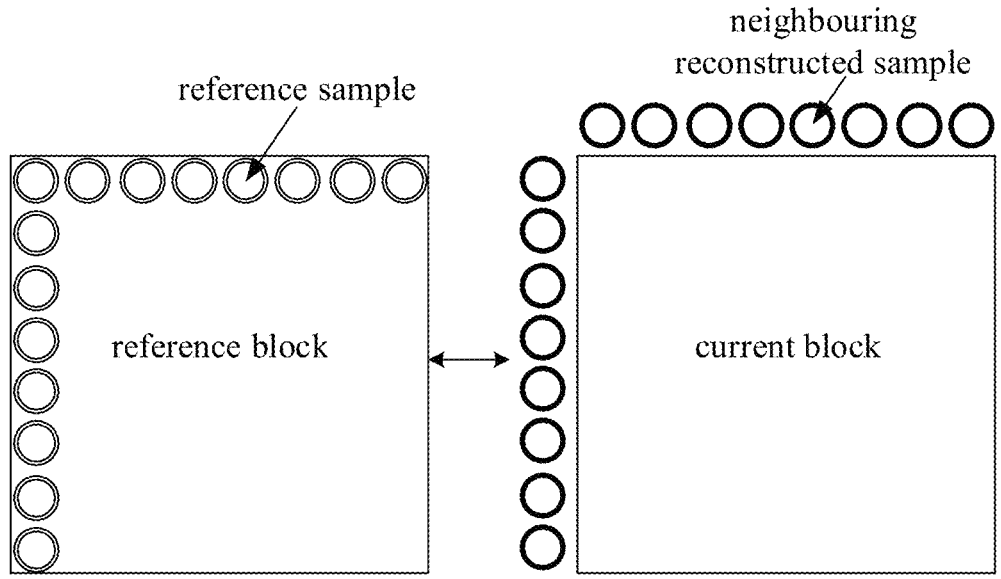
FIG. 9 is schematic diagram 3 of arrangement of a current block and a reference block provided in implementations of the disclosure.

For example, as illustrated in FIG. 9, in the illumination compensation mode IC_T, the fifth sample of the neighbouring reconstructed block of the top row is used in the current frame, and the fifth sample of a certain row in the reference frame is also used in the current frame.

Figure 10:
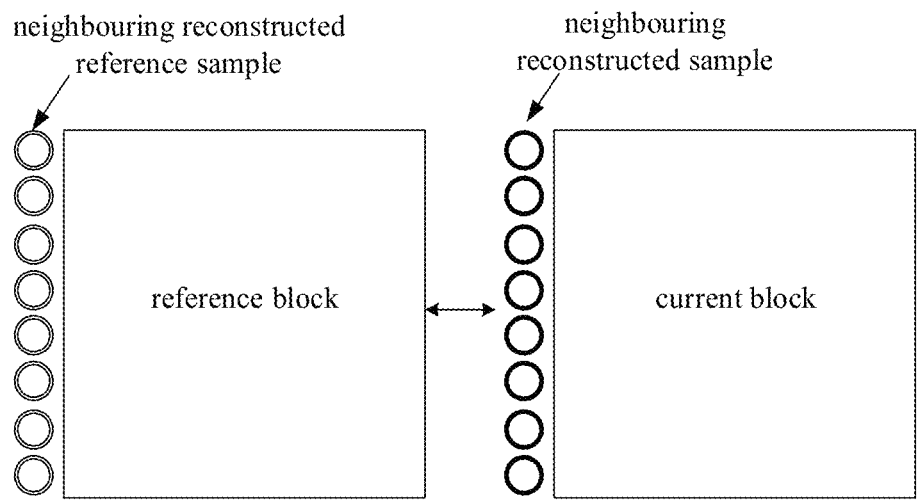
FIG. 10 is schematic diagram 4 of arrangement of a current block and a reference block provided in implementations of the disclosure.

For example, as illustrated in FIG. 10, in the illumination compensation mode IC_L, the first sample of the neighbouring reconstructed block of the left column is used in the current frame, and the first sample of a neighbouring reconstructed reference block of the left column is also used in the reference frame.

Figure 11:
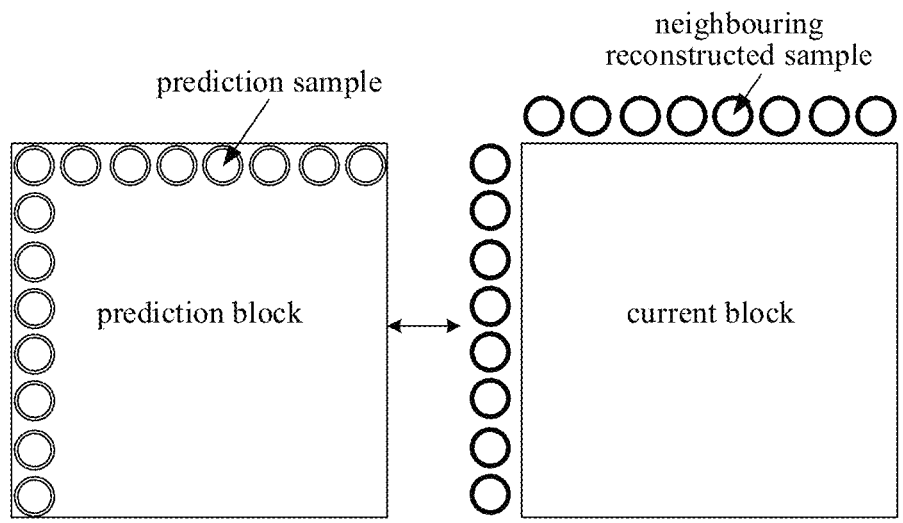
FIG. 11 is schematic diagram 5 of arrangement of a current block and a reference block provided in implementations of the disclosure.

For example, as illustrated in FIG. 11, when compensation of the motion information is completed, the prediction block after motion compensation is obtained, and illumination compensation is performed. In the illumination compensation mode IC_T, the fifth sample of the neighbouring reconstructed block of the top row and the fifth prediction sample of a certain row of the prediction block are used in the current frame.

In implementations of the disclosure, samples of a certain row or a certain column in the reference block can be combined with the reference frame. That is, in some implementations of the disclosure, in the illumination compensation technology, the obtained position and number of the reconstructed reference samples in the reference frame can be any position in the reference block in the reference frame and an integer number greater than 0, such as the first row and/or the first column in the reference block pointed by the motion information, which is not limited in implementations of the disclosure. In addition, the obtained position and number of the reconstructed samples in the current frame should be consistent with the obtained position and number of the reconstructed samples in the reference frame.

It should be noted that, if the current block is partitioned, the reconstructed samples of the current block refer to the reconstructed samples of the sub-block in calculating the model parameters of each sub-block.

It can be understood that, in the process of encoding the current block, when the illumination compensation technology is used, the decoder determines which illumination compensation mode is used for illumination compensation from the top-left illumination compensation mode, the top illumination compensation mode, and the left illumination compensation mode through the index information of the target illumination compensation mode parsed from the bitstream. In this process, because the top-left illumination compensation mode, the top illumination compensation mode, and the left illumination compensation mode are determined by samples of neighbouring edges at different positions, which is considered based on different neighbouring edges, different illumination compensation modes can be used for illumination compensation. Therefore, in the case of large difference of samples of different neighbouring edges, different sample positions can correspond to different illumination compensation models, and different illumination compensation models can be selected for the prediction process of the current block, which can improve the decoding accuracy.

In some implementations of the disclosure, the decoder can obtain current motion information and a current prediction mode, when parsing the bitstream, and predict the current block according to the index information of the target illumination compensation mode, the current prediction mode, and the current motion information, to obtain a prediction value.

In some implementations of the disclosure, the decoder may determine an initial prediction block corresponding to the current block based on the current motion information, perform motion compensation on the initial prediction block, to obtain a first prediction block, determine a model parameter with the index information of the target illumination compensation mode, perform illumination compensation on the first prediction block with the model parameter, to obtain a second prediction block, and perform inter prediction on the second prediction block with the current prediction mode, to obtain the prediction value.

In some implementations of the disclosure, the decoder performs inter prediction on the current block according to the index information of the target illumination compensation mode, the current prediction mode, and the current motion information, to obtain the prediction value in the following three manners.

Manner 1

The decoder determines the target illumination compensation mode with the index information of the target illumination compensation mode, determines the initial prediction block corresponding to the current block based on the current motion information, performs motion compensation on the initial prediction block to obtain the first prediction block, performs illumination compensation on the first prediction block with the target illumination compensation mode, to obtain the second prediction block, and performs inter prediction on the second prediction block with the current prediction mode, to obtain the prediction value.

Manner 2

The decoder determines the target illumination compensation mode with the index information of the target illumination compensation mode, determines the initial prediction block corresponding to the current block based on the current motion information, performs illumination compensation on the initial prediction block with the target illumination compensation mode, to obtain the third prediction block, performs motion compensation on the third prediction block, to obtain the fourth prediction block, and performs inter prediction on the fourth prediction block with the current prediction mode, to obtain the prediction value.

Manner 3

The decoder determines the initial prediction block corresponding to the current block based on the current motion information, performs motion compensation on the initial prediction block, to obtain the first prediction block, determines the target illumination compensation mode with the index information of the target illumination compensation mode, performs illumination compensation on the first prediction block with the target illumination compensation mode, to obtain the second prediction block; and performs inter prediction on the second prediction block with the current prediction mode, to obtain the prediction value.

The decoder can first determine the target illumination compensation mode, and the process of performing illumination compensation based on the target illumination compensation mode can be before or after motion compensation. In manner 1, illumination compensation is performed after motion compensation, and in manner 2, illumination compensation is performed before motion compensation, which is not limited in implementations of the disclosure.

In implementations of the disclosure, when the decoder calculates the target illumination compensation mode, the used reconstructed reference sample of the reference block of the reference frame may be the sample before motion compensation or the sample after motion compensation. In manner 3, the reconstructed reference sample of the reference block of the reference frame is the sample after motion compensation, and in manner 1, the reconstructed reference sample of the reference block of the reference frame is the sample before motion compensation, which is not limited in implementations of the disclosure.

Understandably, if illumination compensation is performed before motion compensation, the difficulty of hardware implementation and the complexity of implementation can be reduced, while if illumination compensation is performed after motion compensation, the encoding and decoding effect can be better.

In some implementations of the disclosure, the index information of the target illumination compensation mode includes first index information and second index information.

In implementations of the disclosure, the decoder can determine the neighbouring edge used for model calculation of the target illumination compensation mode according to the index information of the target illumination compensation mode, and then directly solve the corresponding scaling factor and offset factor according to the formulas (2)-(4), and finally substitute into the formula (1) to obtain the target illumination compensation mode.

In some implementations of the disclosure, the decoder determines which illumination compensation mode to use when the illumination compensation usage flag of the current block is valid. When the illumination compensation usage flag of the current block is invalid, the illumination compensation is not used.

In implementation of the disclosures, the decoder determines the target illumination compensation mode with the index information of the target illumination compensation mode in the following two manners.

Manner 1

If the first index information is invalid, the target illumination compensation mode is determined to be the top-left illumination compensation mode. If the first index information is valid and the second index information is invalid, the target illumination compensation mode is determined to be the top illumination compensation mode. If the first index information is valid and the second index information is valid, the target illumination compensation mode is determined to be the left illumination compensation mode.

Manner 2

If the first index information is valid, the target illumination compensation mode is determined to be the top-left illumination compensation mode. If the first index information is invalid and the second index information is invalid, the target illumination compensation mode is determined to be the top illumination compensation mode. If the first index information is invalid and the second index information is valid, the target illumination compensation mode is determined to be the left illumination compensation mode.

It should be noted that the decoder uses different representations of the first index information and the second index information to embody the three illumination compensation modes.

Exemplarily, syntax of code word transmission during illumination compensation is illustrated in Table 1.

TABLE 1

| IC_Index | IC_flag | IC_index0 | IC_index1 |
|---|---|---|---|
| No_IC | 0 | — | — |
| IC_TL | 1 | 0 | — |
| IC_T | 1 | 1 | 0 |
| IC_L | 1 | 1 | 1 |

IC_Index is the type of illumination compensation mode, including IC_TL, IC_T, and IC_L, and IC_flag represents illumination compensation usage flag, where IC_index0 is the first index information and IC_index1 is the second index information. The syntax logic of Table 1 is described below with '1' as valid and '0' as invalid.

In implementations of the disclosure, for Table 1, if the illumination compensation usage flag is invalid, there is no available illumination compensation mode. Only when the illumination compensation usage flag is valid, if IC_index0 is invalid, the target illumination compensation mode is determined to be IC_TL; if IC_index0 is valid and IC_index1 is invalid, the target illumination compensation mode is determined to be IC_T; if IC_index0 is valid and IC_index1 is valid, the target illumination compensation mode is determined to be IC_L.

It should be noted that, in addition to the above two, exchange of the index information of the target illumination compensation mode IC_L and the target illumination compensation mode IC_T can also be feasible, or '0' denoting valid and '1' denoting invalid is also feasible to realize the above determination logic, which is not limited in implementations of the disclosure.

Exemplarily, inter prediction is described with '1' representing valid and '0' representing invalid.

The decoder obtains the bitstream, and parses the bitstream to obtain the illumination compensation enabled flag of the current video sequence.

In the inter prediction decoding process, if the illumination compensation enabled flag is '1', the illumination compensation frame-level enabled flag of the current frame is parsed out, and if the illumination compensation frame-level enabled flag is '1', all the following steps are performed, and if the illumination compensation enabled flag is '0' or the illumination compensation frame-level enabled flag is '0', only steps a), b), d), and f) are performed.

a) The bitstream is obtained and decoded to obtain residual information, and time domain residual information are obtained through inverse transformation and inverse quantization.
  b) The bitstream is parsed to obtain the inter prediction mode and the MV index of the current decoding block.
  c) The bitstream is parsed to obtain the IC usage flag of the current decoding block. Taking the syntax in Table 1 as an example, if the IC usage flag of the current decoding block is 'true', then continue to parse the bitstream to obtain the first illumination compensation mode index flag of the current decoding block, otherwise, the illumination compensation technology is not used for the current coding unit. If the first illumination compensation mode index flag is 'true', then continue to parse out the second illumination compensation mode index flag, otherwise, the illumination compensation mode index is set to 1, indicating that the first illumination compensation linear mode IC_TL is used (the top and left reconstructed samples can be used for calculation of illumination compensation linear model). If the second illumination compensation mode index flag obtained by parsing is 'true', the illumination compensation mode index is set to 3, indicating that the third illumination compensation linear mode IC_L is used (only the left reconstructed samples can be used for calculation of illumination compensation linear model), otherwise, the illumination compensation mode index is set to 2, indicating that the second illumination compensation linear mode IC_T is used (only the top reconstructed samples can be used for calculation of illumination compensation linear model). According to the obtained illumination compensation mode index, the reconstructed samples at corresponding positions are obtained, to calculate the linear model parameters and obtain the scaling factor a and the offset factor b.

d) Motion compensation is performed on the current decoding block, to obtain the prediction block.

e) If the illumination compensation usage flag is not '0', that is, illumination compensation needs to be performed on the current prediction block, all samples in the current prediction block are linearly offset according to the scaling factor a and the offset factor b obtained in c), to obtain the final prediction block.

f) The final prediction block is added to the residual information restored in a), to obtain the reconstructed block of the current coding unit, which is output after post-processing.

Understandably, the index information of the target illumination compensation mode only occupies two code words, which can save the bitstream.

It should be noted that, in the process of calculating linear model parameters, all sample values are sorted, and then the maximum value and the minimum value are removed, and the average value of the two larger values and the average value of the two smaller values are obtained; or points are taken at intervals, such as the first point and the penultimate point at the top and the first point and the penultimate point on the left, and then are sorted, and the average value of two larger values and the average value of two smaller values are obtained; the subsequent calculation steps are consistent with the above.

In some implementations of the disclosure, the at least one first sample is samples spaced by a preset spacing sample position in a neighbouring reconstructed block of a top row of the current block. The at least one second sample is samples separated by the preset spacing sample position in a neighbouring reconstructed block of a left column of the current block. The at least one third sample is samples separated by the preset spacing sample position in a neighbouring reconstructed reference block of a previous row of the initial prediction block. The at least one fourth sample is samples separated by the preset spacing sample position in samples of the N-th row in the initial prediction block. The at least one fifth sample is samples separated by the preset spacing sample position in a neighbouring reconstructed reference block of a left column of the initial prediction block. The at least one sixth sample is samples separated by the preset spacing sample position in samples of the M-th column in the initial prediction block.

In implementations of the disclosure, in the process of calculating a and b of the target illumination compensation mode by the decoder, all sample values are sorted, and then the maximum value and the minimum value are removed, and the average value of the two larger values and the average value of the two smaller values are obtained, that is, consistent with the description in the above implantations. Alternatively, points at sample positions are taken at intervals by the decoder, such as the first point and the penultimate point at the top and the first point and the penultimate point on the left, and then are sorted, and the average value of two larger values and the average value of two smaller values are obtained, and then a and b are calculated according to formulas (2)-(4), to obtain the target illumination compensation mode of formula (1). Refer to the following.

In some implementations of the disclosure, the decoder determines that the target illumination compensation mode is the top-left illumination compensation mode based on the top reconstructed samples and the left reconstructed samples of the current frame, and the top reconstructed reference samples and the left reconstructed reference samples of the reference frame at same corresponding sample positions as follows.

At least one first sample value of the at least one first sample and at least one second sample value of the at least one second sample are sorted, to determine first n larger first sample values and first n smaller first sample values, where n is a positive integer greater than or equal to 1 and less than the number of columns and the number of rows of the current block. The at least one third sample or the at least one fourth sample, and the at least one fifth sample or the at least one sixth sample are sorted, to determine first n larger second sample values and first n smaller second sample values. A first maximum average of the first n larger first sample values, a first minimum average of the first n smaller first sample values, a second maximum average of the first n larger second sample values, and a second minimum average of the first n smaller second sample values are determined. A first scaling factor and a first offset factor are determined based on the first maximum average, the first minimum average, the second maximum average, and the second minimum average. The top-left illumination compensation mode is determined based on the first scaling factor, the first offset factor, and an initial top-left illumination compensation mode, where the top-left illumination compensation mode is the target illumination compensation mode.

In some implementations of the disclosure, the decoder determines that the target illumination compensation mode is the top illumination compensation mode based on the top reconstructed samples of the current frame and the top reconstructed reference samples of the reference frame at same corresponding sample positions as follows.

At least one first sample value of the at least one first sample is sorted, to determine the first m larger third sample values and the first m smaller third sample values, where m is a positive integer greater than or equal to 1 and less than the number of columns and the number of rows of the current block. The at least one third sample or the at least one fourth sample is sorted, to determine the first m larger fourth sample values and the first m smaller fourth sample values. A third maximum average value of the first m larger third sample values, a third minimum average value of the first m smaller third sample values, a fourth maximum average value of the first m larger fourth sample values, and a fourth minimum average value of the first m smaller fourth sample values are determined. A second scaling factor and a second offset factor are determined based on the third maximum average, the third minimum average, the fourth maximum average, and the fourth minimum average. The top illumination compensation mode is determined based on the second scaling factor, the second offset factor, and an initial top illumination compensation mode, where the top illumination compensation mode is the target illumination compensation mode.

In some implementations of the disclosure, the decoder determines that the target illumination compensation mode is the left illumination compensation mode based on the left reconstructed samples of the current frame and the left reconstructed reference samples of the reference frame at same corresponding sample positions as follows.

At least one second sample value of the at least one first sample is sorted, to determine the first h larger fifth sample values and the first h smaller fifth sample values, where h is a positive integer greater than or equal to 1 and less than the number of columns and the number of rows of the current block. At least one fifth sample or at least one sixth sample is sorted, to determine the first h larger sixth sample values and the first h smaller sixth sample values. A fifth maximum average of the first h larger fifth sample values, a fifth minimum average of the first h smaller fifth sample values, a sixth maximum average of the first h larger sixth sample values, and a sixth minimum average of the first h smaller sixth sample values are determined. A third scaling factor and a third offset factor are determined based on the fifth maximum average, the fifth minimum average, the sixth maximum average, and the sixth minimum average. Based on the third scaling factor, the third offset factor, and an initial left illumination compensation mode, the left illumination compensation mode is determined, where the left illumination compensation mode is the target illumination compensation mode.

In some implementations of the disclosure, the above illumination compensation is applied to any position in the implementation flow of bi-directional optical flow (BDOF/BIO), decoder side motion vector refinement (DMVR), bi-prediction with CU-level weights (BCW), bi-directional gradient correction (BGC), inter prediction filtering (INTERPF), or combined inter and intra prediction (CIIP).

The illumination compensation technology can be applied to any position of other technologies such as BDOF/BIO, DMVR, BCW, BGC, INTERPF, or CIIP. For example, the illumination compensation technology is applied before the BDOF/BIO and BCW technology, etc., which is not limited in the implementations of the disclosure.

In some implementations of the disclosure, the processing of at least one of BDOF/BIO, DMVR, BCW, BGC, INTERPF, or CIIP and the illumination compensation are not applied to the same current block.

The illumination compensation technology does not apply to the same current block together with other technologies. If the IC technology is used for the current block, the current block is no longer modified/refined and compensated by using BDOF/BIO. Implementations of the disclosure are not limited.

In some implementations of the disclosure, the top-left illumination compensation mode includes a luma top-left illumination compensation mode, a first chroma top-left illumination compensation mode, and a second chroma top-left illumination compensation mode. The top illumination compensation mode includes a luma top illumination compensation mode, a first chroma top illumination compensation mode, and a second chroma top illumination compensation mode. The left illumination compensation mode includes a luma left illumination compensation mode, a first chroma left illumination compensation mode, and a second chroma left illumination compensation mode.

In implementations of the disclosure, for the illumination compensation technology, the linear model for different colour components needs to be recalculated. For example, for the YUV colour space, the linear model corresponding to each of the three colour components Y, U, and V needs to be calculated.

It should be noted that the current CU can restrict the minimum area and the maximum area for the IC technology.

In some implementations of the disclosure, the size of the current block ranges from 64 pixels and 128×128 pixels.

Implementations of the disclosure are not limited to a specific area. The illumination compensation technology uses the area limit or width-height limit at the coding unit level, such as the minimum area is 64 and the maximum area is 128×128.

In some implementations of the disclosure, the decoder may parse the bitstream to obtain a frame-level illumination compensation enabled flag of the current frame, use the frame-level illumination compensation enabled flag as the illumination compensation enabled flag, and then perform decoding process.

In the illumination compensation technology, a frame-level switch is added, and the decoder obtains the frame-level switch and determines whether to continue to obtain the illumination compensation usage flag at the coding unit level of the current frame and the index information of the illumination compensation mode.

In some implementations of the disclosure, the decoder may parse the bitstream to obtain a frame-level prediction mode illumination compensation enabled flag of the current frame, use the frame-level prediction mode illumination compensation enabled flag as the illumination compensation enabled flag, and then perform decoding process.

In implementations of the disclosure, the decoder adds a frame-level flag specific to the normal inter prediction mode or SKIP, MERGE (DIRECT), which is used to limit the use of illumination compensation technology in some of the prediction modes, but is not limited to these, and can also be other specific prediction modes, which can be determined according to actual settings.

In some implementations of the disclosure, the top-left illumination compensation mode includes multiple sub-top-left illumination compensation modes, and the multiple sub-top-left illumination compensation modes are applied to different sample regions of the initial prediction block. The top illumination compensation mode includes multiple sub-top illumination compensation modes, and the multiple sub-top illumination compensation modes are applied to different sample regions of the initial prediction block. The left illumination compensation mode includes multiple sub-left illumination compensation modes, and the multiple sub-left illumination compensation modes are applied to different sample regions of the initial prediction block.

It should be noted that multiple linear models can be solved in one coding unit block and applied to different regions in the current block, so that one block can select the illumination compensation mode based on its own characteristics, and make illumination compensation more suitable for its own characteristics, thereby improving the decoding accuracy.

Exemplarily, the decoding part of the inter prediction provides selection for the inter prediction in operations requiring illumination compensation or local linear transform. For the region with obvious luma changes between the current frame and the reference frame, the linear transform model can be calculated by using the illumination compensation technology. After illumination compensation is performed on the current coding block, the prediction block will be closer to the original picture block, making the residual error smaller, and finally improving the encoding efficiency.

It will be understood that the illumination compensation method of the disclosure provides selection for inter prediction or the like in operations requiring illumination compensation or local linear transform or the like. For the region with obvious luma changes between the current frame and the reference frame, the linear transform model can be calculated by using the illumination compensation technology. After compensation is performed on the current coding block, the prediction block will be closer to the original picture block, making the residual error smaller, and finally improving the encoding efficiency.

The illumination compensation method of the disclosure was tested on the official simulation platform HPM10.0 of AVS. After the IC technology was integrated and enabled, for the classes of 4K, 1080P, and 720P, the test results were illustrated in Table 2 under the test conditions of random access and low delay. Table 2 illustrates the results under the test condition of random access.

TABLE 2

| Class | Y | U | V |
| --- | --- | --- | --- |
| 4K | −0.02% | −0.33% | −0.08% |
| 1080P | −0.38% | −0.00% | −0.24% |
| 720P | −0.73% | −0.48% | −0.26% |
| Average performance | −0.38% | −0.27% | −0.14% |

Under the test condition of random access, the luma component saves 0.38% BDBR, and the UV components respectively save 0.27% and 0.14% BDBR, which can obviously show high performance and effectively improve the decoding efficiency of the decoder. Secondly, under the test condition of low delay, the luma component and UV components also save BDBR, which can obviously show high performance and effectively improve the encoding efficiency of encoder.

From the view of application, the test condition of low delay mainly faces applications such as live broadcast industry and public service video. In the well-developed Internet era, this technology will effectively reduce the bit rate and bandwidth.

It should be noted that the illumination compensation of the implementations of the disclosure can also be applied to the inter non-rectangular block prediction technology, that is, the illumination compensation technology is used in geometric partitioning mode (GPM) in VVC and angular weighted prediction (AWP) technology in AVS. After the decoder combines the motion-compensated prediction blocks of two reference frames in some way to get a new prediction block, the illumination compensation technology can be used for prediction compensation. Some of the above ways can be taking non-rectangular region prediction samples of different prediction blocks respectively for combination. That is, for the current block, a second sub-prediction block is obtained by combining a non-rectangular region of a first sub-prediction block specified by one motion information and a complementary non-rectangular region of the first prediction block specified by another motion information. The inter non-rectangular block prediction technology can be GPM in VVC, AWP in AVS, inter-inter in AV, etc., which are not limited herein.

The illumination compensation is performed on the second sub-prediction block with the target illumination compensation mode, to obtain the target prediction block, which is the final prediction block of the current block.

In some implementations of the disclosure, in the illumination compensation method, a flag can be added into the group of pictures (GOP), i.e., a picture-set-level illumination compensation enabled flag, which is used to indicate whether the illumination compensation technology is enabled for the current GOP. The picture-set-level illumination compensation enabled flag needs to be signalled into the bitstream, which is parsed at the decoder. If the illumination compensation enabled flag is valid, the picture-set-level illumination compensation enabled flag in the bitstream is obtained. If the picture-set-level illumination compensation enabled flag is valid, the illumination compensation frame-level enabled flag in the bitstream is obtained. For example, in a specific configuration, the video has 500 frames, 25 frames of the 500 frames are one picture set, and each frame with a picture-set-level enabled flag of 1 has a frame-level picture enabled flag, that is, an illumination compensation frame-level enabled flag, which can further save overhead of the bitstream.

In some implementations of the disclosure, the illumination compensation method can be combined with affine transformation prediction technology, such as AFFINE and prediction refinement with optical flow for affine (PROF), which is improvement of AFFINE, in VVC, AFFINE, AFFINE_UMVE (ultimate motion vector expression), and affine secondary prediction (ASP, similar to PROF in VVC) in AVS, and other technologies. That is, the decoder performs illumination compensation on the prediction block, i.e., the reference block after affine motion compensation according to the affine transformation parameters.

In implementations of the disclosure, when parsing the bitstream, the decoder obtains a current affine transformation parameter, performs affine motion compensation on the current block based on the current affine transformation parameter, to obtain a third prediction block, determines a model parameter with the index information of the target illumination compensation mode, and performs illumination compensation on the third prediction block with the model parameter, to obtain a fourth prediction block. The fourth prediction block is the final prediction block of the current block.

In the implementation of the disclosure, when parsing the bitstream, the decoder obtains modified/refined motion information, performs motion compensation on the current block based on the modified/refined motion information, to obtain a fifth prediction block (i.e., a motion-compensated prediction block), determines a model parameter with the index information of the target illumination compensation mode, and performs illumination compensation on the fifth prediction block with the model parameter, to obtain a sixth prediction block (i.e., an illumination-compensated prediction block). The sixth prediction block is the final prediction block of the current block.

The modified/refined motion information is determined by any one of ultimate motion vector expression, enhanced temporal motion vector prediction, motion vector angular prediction, or motion vector difference.

In implementations of the disclosure, the illumination compensation method can be combined with any technology for modifying/refining the MV, such as merge mode with MVD (MMVD) in VVC, and ultimate motion vector expression (UMVE), enhanced temporal motion vector prediction (ETMVP), and motion vector angular prediction (MVAP) in AVS, and other technologies. That is, the decoder performs illumination compensation on the prediction block, i.e., the MV-modified/refined/enhanced reference block after motion compensation.

Understandably, in the process of decoding the current block, in the case of using the illumination compensation technology, the decoder can directly obtain the illumination compensation frame-level enabled flag at the frame level from the bitstream, so that the decoder can determine from the frame level whether there is a need to continue to obtain a block-level illumination compensation usage flag, and only in the case that the illumination compensation frame-level enabled flag is valid, a CU-level flag in the bitstream can be obtained, and subsequent decoding can be performed, to perform prediction (such as inter prediction) on the current block. Therefore, when the illumination compensation frame-level enabled flag is invalid, the transmission bits of the bitstream will be greatly reduced. Therefore, when illumination compensation is selected for a frame-level picture based on different situations, an illumination compensation frame-level enabled flag at the frame level is added, to represent whether the illumination compensation technology is used, to save the bit overhead of coding and improve the performance of coding.

Implementations of the disclosure provide an illumination compensation method, which is applied to a video encoding device, i.e., an encoder. The function of the method can be achieved by invoking program codes by a second processor in the video encoding device, and the program codes can be stored in a computer storage medium. It can be seen that the video encoding device at least includes the second processor and a second storage medium.

Figure 12:
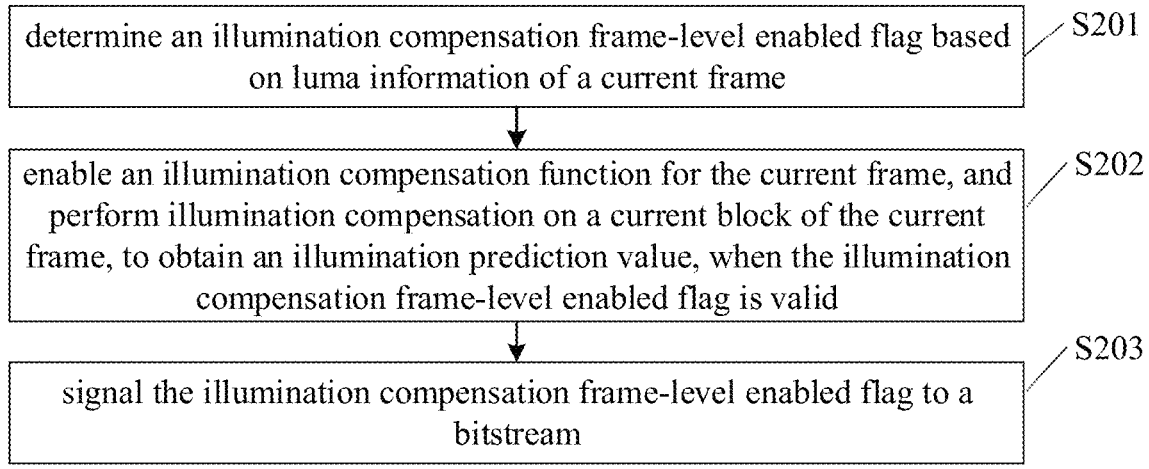
FIG. 12 is a flowchart of an illumination compensation method further provided in implementations of the disclosure.

FIG. 12 is a schematic flowchart of an illumination compensation method of the implementation of the disclosure. As illustrated in FIG. 12, the method includes the following.

S201, an illumination compensation frame-level enabled flag is determined based on luma information of a current frame.

S202, an illumination compensation function is enabled for the current frame, and illumination compensation is performed on a current block of the current frame, to obtain an illumination prediction value, when the illumination compensation frame-level enabled flag is valid.

S203, the illumination compensation frame-level enabled flag is signalled to a bitstream.

The illumination compensation method provided in implementations of the disclosure can be combined with various application scenarios of the prediction technology, such as inter prediction, inter non-rectangular prediction, affine transformation prediction, etc. The implementations of the disclosure are not limited. Exemplarily, on the basis of the inter prediction, the illumination compensation technology can also be used, to achieve the inter prediction. That is, when the IC is allowed, the inter prediction process at the encoder side is performed.

In implementations of the disclosure, the video picture may be partitioned into multiple picture blocks, each picture block currently to-be-encoded may be referred to as a coding block. Each coding block may include a first colour component, a second colour component, and a third colour component. The current block is a coding block currently to be predicted for the first colour component, the second colour component, or the third colour component in the video picture.

If prediction is performed on the first colour component of the current block and the first colour component is a luma component, i.e., the colour component to-be-predicted is a luma component, the current block can also be called a luma block. Alternatively, if prediction is performed on the second colour component of the current block and the second colour component is a chroma component, i.e., the colour component to-be-predicted is a chroma component, the current block can also be called a chroma block.

In some implementations of the disclosure, the encoder determines the illumination compensation frame-level enabled flag based on the luma information of the current frame. If the illumination compensation frame-level enabled flag is valid, the illumination compensation function is enabled for the current frame, and the current block of the current frame is allowed or enabled for illumination compensation, and then the corresponding illumination prediction values are obtained by traversing different illumination compensation modes, and the illumination compensation frame-level enabled flag is signalled into the bitstream.

In some implementations of the disclosure, the illumination compensation frame-level enabled flag includes at least one illumination compensation frame-level enabled flag. That is, in implementations of the disclosure, one illumination compensation enabled flag at the frame level indicates that the illumination compensation technology is enabled for the current picture to-be-encoded (i.e., the current frame), or multiple illumination compensation enabled flags at the frame level indicate that the illumination compensation technology is enabled for the current picture to-be-encoded.

In some implementations of the disclosure, when a luma difference value greater than a preset luma change threshold exists in at least one luma difference value, a valid illumination compensation frame-level enabled flag corresponding to the luma difference value is determined; and when no luma difference value greater than the preset luma change threshold exists in the at least one luma difference value, an invalid illumination compensation frame-level enabled flag is determined.

It should be noted that the encoder can set the preset luma change threshold, and compares the at least one luma difference value between the current frame and at least one reference frame with the preset luma change threshold, to determine the illumination compensation frame-level enabled flag of the current frame. Specifically, if the luma difference value greater than the preset luma change threshold exists in the at least one luma difference value, the luma difference value corresponds to a valid illumination compensation frame-level enabled flag, that is, the illumination compensation frame-level enabled flag of the current frame is valid; if the at least one luma difference value is less than or equal to the preset luma change threshold, the illumination compensation frame-level enabled flag of the current frame is invalid.

In implementations of the disclosure, the at least one illumination compensation frame-level enabled flag is in one-to-one correspondence with different prediction modes of the current frame, or the at least one illumination compensation frame-level enabled flag is in one-to-one correspondence with different regions of the current frame. That is, for different prediction modes or different picture regions of one frame, different illumination compensation frame-level enabled flags can be used. In some implementations of the disclosure, the illumination compensation frame-level enabled flag includes N levels of illumination compensation frame-level enabled flags corresponding to prediction modes. In this case, the encoder can determine the illumination compensation frame-level enabled flag based on the luma information of the current frame as follows. The encoder determines at least one luma difference value between the current frame and at least one reference frame based on the luma information of the current frame, and determines the illumination compensation frame-level enabled flag based on the at least one luma difference value and the preset luma change threshold.

In some implementations of the disclosure, the preset luma change threshold includes: a first preset luma change threshold and a second preset luma change threshold, the second preset luma change threshold is greater than the first preset luma change threshold, and the illumination compensation frame-level enabled flag includes N levels of illumination compensation frame-level enabled flags corresponding to prediction modes. N is a positive integer greater than or equal to 1.

The encoder further determines the illumination compensation frame-level enabled flag based on the at least one luma difference value and the preset luma change threshold as follows. The encoder determines that the N levels of illumination compensation frame-level enabled flags are all valid, when the at least one luma difference value is greater than the second preset luma change threshold, determines that the N levels of illumination compensation frame-level enabled flags are all invalid, when the at least one luma difference value is less than the first preset luma change threshold; and determines that a first level of illumination compensation frame-level enabled flag is valid and other levels of illumination compensation frame-level enabled flags are invalid, when the at least one luma difference value is greater than the first preset luma change threshold and is less than the second preset luma change threshold.

In some implementations of the disclosure, the prediction mode may include a merge mode/direct mode, a skip mode, a normal inter mode, and the like, and are not limited by implementations of the disclosure.

Exemplarily, when N=3, the first level of illumination compensation frame-level enabled flag corresponds to a merge mode/direct mode, a second level of illumination compensation frame-level enabled flag corresponds to a skip mode, and a third level of illumination compensation frame-level enabled flag corresponds to a normal inter mode.

It should be noted that, for different prediction modes, the encoder can determine different threshold ranges according to the number of prediction modes, to determine a prediction mode(s) for which the illumination compensation function or technology is enabled in different threshold ranges. Taking three modes as examples, in implementations of the disclosure, three threshold ranges can be obtained by using the first preset luma change threshold and the second preset luma change threshold. If the at least one luma difference value is greater than the maximum preset luma change threshold, the illumination compensation function is enabled for all prediction modes. If the at least one luma difference value is less than the minimum preset luma change threshold, the illumination compensation function is not enabled for all prediction modes. If different threshold ranges exist between the minimum preset luma change threshold and the maximum preset luma change threshold, each threshold range is determined to correspond to one or several prediction modes, to enable the illumination compensation function.

In implementations of the disclosure, if the at least one luma difference value is greater than the first preset luma change threshold and is less than the second preset luma change threshold, the first level of illumination compensation frame-level enabled flag is determined to be valid and other levels of illumination compensation frame-level enabled flags are determined to be invalid.

It can be understood that the decoder can determine, according to different prediction modes, a prediction mode(s) for which the illumination compensation technology is enabled and a prediction mode(s) for which the illumination compensation technology is not enabled. As such, the encoder can signal from the frame level a part of the code words of the current frame with the illumination compensation technology enabled into the bitstream, while the code words are not transmitted in other cases, thereby saving overhead of the code word and improving the efficiency of uncompressing.

In some implementations of the disclosure, the encoder may further perform region partition on the current frame, to obtain M picture regions and a valid picture region partition flag, calculate luma information of the M picture regions, to obtain corresponding M luma information, and signal the picture region partition flag into the bitstream. M is a positive integer greater than or equal to 1.

It should be noted that, the encoder can set different illumination compensation frame-level enabled flags for different picture regions of the current frame. In implementations of the disclosure, the current frame is partitioned into M picture regions.

In some implementations of the disclosure, the illumination compensation frame-level enabled flag includes M illumination compensation frame-level enabled flags corresponding to the picture regions. In this case, the luma information of the current frame includes the M luma information of the M picture regions.

In some implementations of the disclosure, the encoder may determine the illumination compensation frame-level enabled flag based on the luma information of the current frame as follows. The encoder determines the illumination compensation frame-level enabled flag based on the M luma information and a preset luma information threshold. Alternatively, when luma information greater than the preset luma information threshold exists in the M luma information, a valid illumination compensation frame-level enabled flag corresponding to the luma information is determined, and when no luma information greater than the preset luma information threshold exists in the M luma information, an invalid illumination compensation frame-level enabled flag is determined, and the M illumination compensation frame-level enabled flags is obtained until comparison of the M luma information is completed.

It should be noted that, each luma information is compared with the preset luma information threshold, and if greater than the preset luma information threshold, the illumination compensation frame-level enabled flag of the picture region corresponding to this luma information is valid, otherwise, it is invalid.

In some implementations of the disclosure, the luma information may be calculated by a luma histogram.

In some implementations of the disclosure, the illumination compensation mode includes a top-left illumination compensation mode, a top illumination compensation mode, and a left illumination compensation mode. The illumination prediction value includes a first type of prediction value, a second type of prediction value, and a third type of prediction value.

The encoder traverses multiple candidate motion information to determine the initial prediction value of the initial prediction block corresponding to the current block, where the initial prediction block is in one-to-one correspondence with the multiple candidate motion information, the current block belongs to the current frame, and the initial prediction block belongs to the reference frame. For the initial prediction block, the top-left illumination compensation mode, the top illumination compensation mode, and the left illumination compensation mode are traversed for illumination compensation, to obtain the first type of prediction value, the second type of prediction value, and the third type of prediction value corresponding to multiple candidate motion information, where the top-left illumination compensation mode, the top illumination compensation mode, and the left illumination compensation mode are determined by samples of neighbouring edges at different positions. The rate distortion cost with the original sample value of the current block is calculated by respectively adopting the initial prediction value, the first type of prediction value, the second type of prediction value, and the third type of prediction value, to determine the illumination compensation usage flag, the current prediction mode corresponding to the optimal rate distortion cost, the current motion information, and the target illumination compensation mode. Inter prediction is performed on the current coding block with the current prediction mode, the current motion information, and the target illumination compensation mode, to obtain the current prediction value. The index information of the current prediction mode, the index information of the current motion information, the index information of the target illumination compensation mode, and the illumination compensation usage flag are signalled into the bitstream.

Exemplarily, inter prediction is described as an example, the encoder obtains encoding information, including inter prediction illumination compensation enabled flag, partitions the picture into multiple CTUs after obtaining picture information, and further partitions it into multiple CUs, where inter prediction is performed on each independent CU. The current CU can restrict the minimum area and the maximum area for the IC technology.

In the inter prediction process at the encoder, if the IC enabled flag is '1', the sum of absolute difference (SAD) between the luma histograms of the current picture to-be-encoded and each reference picture, i.e., at least one luma difference value, is calculated. If the SAD between the luma histograms of the current picture to-be-encoded and a certain reference picture is greater than the illumination change threshold, the illumination compensation technology is enabled for the current picture to-be-encoded, or the illumination compensation technology is enabled for some prediction modes of the current picture to-be-encoded, and the enabled flag (i.e., the illumination compensation frame-level enabled flag) of the current picture is signalled into the bitstream and transmitted to the decoder. The illumination change threshold can be preset or determined according to the experience value of the current encoded picture. Some of the prediction modes for the current picture to-be-encoded may be an inter prediction mode, a merge mode, a skip mode, and the like.

If the illumination compensation technology is enabled for the current picture to-be-encoded, all the following steps are performed, and if the IC enabled flag is '0' or the illumination compensation technology is not enabled for the picture to-be-encoded, only a), b), and f) are performed.

a) For inter prediction, all candidate MV motion information is firstly traversed and motion compensation is performed, the prediction sample after motion compensation under each MV is calculated, and the rate distortion cost is calculated according to the original sample.

b) The optimal MV of the current coding unit and the prediction mode (such as SKIP, MERGE/DIRECT, or INTER) are selected according to the principle of determining the minimum one of rate distortion costs of all MVs, and the optimal information and the corresponding rate distortion cost information are recorded.

c) All candidate MVs are traversed again, and in this process, the illumination compensation technology is enabled and three illumination compensation modes are traversed. The reference block is first matched according to the prediction mode and MV, according to the illumination compensation mode index, left and/or top reconstructed samples of the reference block and left and/or top reconstructed samples of the block to-be-encoded of the current frame are extracted, and the reconstructed samples are sorted and averaged (the specific operation is described as above) and are substituted into the above formula, to obtain linear model parameters a and b. The illumination compensation mode index 1 is denoted as IC_TL, and the left and top reconstructed samples of the reference block and the current block can be used to calculate the linear model. The illumination compensation mode index 2 is recorded as IC_T, and only the top reconstructed samples of the reference block and the current block can be used to calculate the linear model. Illumination compensation mode index 3 is denoted as IC_L, and only the left reconstructed samples of the reference block and the current block can be used to calculate the linear model.

d) Motion compensation is performed on the reference block, the prediction block after normal motion compensation is obtained, then illumination compensation is performed on the prediction block, that is, performing linear transform on the samples in each prediction block according to the linear model, and the final prediction block of the current coding unit is obtained.

e) The rate distortion cost information of each MV is calculated according to the final prediction sample after using the illumination compensation technology and the original sample, and the current illumination compensation mode index, and the MV index of the minimum rate distortion cost information, corresponding prediction mode (such as skip mode, merge/direct mode, or normal inter mode), and corresponding cost are recorded.

f) If the illumination compensation technology enabled flag is '0', the MV index and prediction mode recorded in b) are transmitted to the decoder via the bitstream. If the illumination compensation technology enabled flag is '1', the minimum cost value recorded in b) is compared with the minimum cost value recorded in e). If the rate distortion cost in b) is smaller, the MV index and prediction mode recorded in b) are encoded as the optimal information of the current coding unit, and are transmitted to the decoder via the bitstream, and the flag position of the illumination compensation technology of the current coding unit is set 'false', indicating that the illumination compensation technology is not used, which is also transmitted to the decoder via the bitstream. If the rate distortion in e) is smaller, the MV index, the illumination compensation mode index, and the prediction mode recorded in e) are encoded as the optimal information of the current coding unit, and are transmitted to the decoder via the bitstream, and the flag position of the illumination compensation technology of the current coding unit is set 'true' and the illumination compensation mode index of the current coding unit block is encoded, indicating that the illumination compensation technology is used, which is also transmitted to the decoder via the bitstream.

In some implementations of the disclosure, during encoding, the encoder may also determine a size of the current block, and determine an illumination compensation mode of the current block based on the size of the current block and a prediction size threshold.

In some implementations of the disclosure, the encoder determines that the illumination compensation mode of the current block is at least one of: a top-left illumination compensation mode, a top illumination compensation mode, or a left illumination compensation mode, when the size of the current block is less than the prediction size threshold; or determines that the illumination compensation mode of the current block is at least one of: the top-left illumination compensation mode, the top illumination compensation mode, or the left illumination compensation mode, when the size of the current block is greater than the prediction size threshold.

Exemplarily, the illumination compensation technology allows for prediction compensation on all prediction blocks by using IC_TL, IC_T, and IC_L, or may also limit the usage range, for example, only illumination compensation modes IC_TL or IC_T or IC_L may be used for a coding unit with a small number of samples or a coding unit with a width/height less than a preset threshold. The illumination compensation technology allows for prediction compensation on all prediction blocks by using IC_TL, IC_T, and IC_L, or may also limit the usage range, for example, only illumination compensation modes IC_TL or IC_T or IC_L may be used for a coding unit with a large number of samples or a coding unit with a width/height greater than the preset threshold.

It can be understood that, for the current blocks with different sizes, the encoder can use a part of illumination modes to determine the illumination prediction value, which can avoid the traversal of all illumination compensation modes, and reduce the computational complexity and save bits.

In some implementations of the disclosure, during encoding the current block, the encoder may perform region partition on the current block to obtain at least two sub-blocks of at least two regions, and then encode the at least two sub-blocks.

In some implementations of the disclosure, the encoder enables the illumination compensation function for the current frame, and performs illumination compensation on the current block of the current frame, to obtain the illumination prediction value, when the illumination compensation frame-level enabled flag is valid as follows.

Multiple candidate motion information are traversed, to determine an initial prediction value of an initial prediction block corresponding to each of the at least two sub-blocks, where the initial prediction block is in one-to-one correspondence to the multiple candidate motion information; and for the initial prediction block of each sub-block, different illumination compensation modes are traversed for illumination compensation, to obtain corresponding illumination prediction values, when the illumination compensation frame-level enabled flag is valid.

It should be noted that, for the initial prediction block of each sub-block, the encoder traverses the different illumination compensation modes for illumination compensation, to obtain the corresponding illumination prediction values. The encoder can, for each illumination compensation mode, determine reconstructed samples of the current frame and reconstructed reference samples of a reference frame, determine an h-th model parameter corresponding to an h-th region based on the reconstructed samples of the current frame and the reconstructed reference samples of the reference frame, where h is a positive integer greater than or equal to 1 and less than the number of the at least two sub-blocks, perform illumination compensation on the h-th region based on the h-th model parameter, to obtain an h-th illumination prediction value of an h-th region prediction block, and perform illumination compensation on an (h+1)-th region until illumination compensation on the at least two sub-blocks of the at least two regions is completed.

In some implementations of the disclosure, the encoder determines the h-th model parameter corresponding to the h-th region based on the reconstructed samples of the current frame and the reconstructed reference samples of the reference frame in at least one of the following manners.

Manner 1

When an h-th neighbouring reconstructed reference sample adjacent to the h-th region exists in the reconstructed reference samples of the reference frame, the h-th model parameter is calculated based on the h-th neighbouring reconstructed reference sample and reconstructed samples of the h-th region in the reconstructed samples of the current frame; and when h is not equal to 1 and no reconstructed reference sample adjacent to the h-th region exists in the reconstructed reference samples of the reference frame, the h-th model parameter is calculated based on neighbouring samples in an (h−1)-th region prediction block and the reconstructed samples of the h-th region in the reconstructed samples of the current frame.

Manner 2

When h is not equal to 1 and an h-th neighbouring reconstructed reference sample adjacent to the h-th region exists in the reconstructed reference samples of the reference frame, the h-th model parameter is calculated based on the h-th neighbouring reconstructed reference sample, neighbouring samples in a first region prediction block to an (h−1)-th region prediction block, and reconstructed samples of the h-th region in the reconstructed samples of the current frame; and when h is not equal to 1 and no reconstructed reference sample adjacent to the h-th region exists in the reconstructed reference samples of the reference frame, the h-th model parameter is calculated based on the neighbouring samples in the first region prediction block to the (h−1)-th region prediction block and the reconstructed samples of the h-th region in the reconstructed samples of the current frame.

Manner 3

After the encoder determines the h-th model parameter corresponding to the h-th region based on the reconstructed samples of the current frame and the reconstructed reference samples of the reference frame, when h is not equal to 1, at least one of a first model parameter to an (h−1)-th new model parameter is weighted with the h-th model parameter, to obtain an h-th new model parameter, and illumination compensation is performed on the h-th region based on the h-th new model parameter, to obtain the h-th illumination prediction value of the h-th region prediction block.

In some implementations of the disclosure, the encoder may also generate a valid block region partition flag and signal the block region partition flag into the bitstream.

Understandably, in the process of encoding the current block, on the premise of performing the illumination compensation function on the current block (i.e., when the illumination compensation usage flag of the current block is valid), the encoder can perform block region partition on the current block, to obtain the at least two sub-blocks, calculate the illumination compensation mode corresponding to each sub-block, and then perform illumination compensation based on the respective target illumination compensation mode. As such, the illumination compensation mode is determined for each sub-block, and different processing is performed on different sub-blocks, thereby improving the encoding accuracy and the encoding performance.

In some implementations of the disclosure, the illumination compensation mode in the implementation of the disclosure may include: the top-left illumination compensation mode, the top illumination compensation mode, and the left illumination compensation mode. The illumination compensation is performed, to obtain illumination prediction values corresponding to multiple candidate motion information.

It should be noted that, the encoder determines a colour component to-be-predicted of the current block, performs predictive coding on the colour component to-be-predicted respectively with the multiple prediction modes based on parameters of the current block, to obtain the initial prediction value, and then calculates the rate distortion cost corresponding to each prediction mode of the multiple prediction modes based on the initial prediction value, selects a minimum rate distortion cost (i.e., a first minimum rate distortion cost) from the multiple calculated rate distortion costs, and determines the minimum rate distortion cost as an optimal rate distortion cost, and determines a prediction mode corresponding to the optimal rate distortion cost as the prediction mode of the current block.

However, in the implementation of the disclosure, the encoder also needs to traverse the illumination compensation modes to determine the illumination prediction values, calculate the rate distortion cost corresponding to each prediction mode of the multiple prediction modes based on the illumination prediction values, and then compare the rate distortion cost corresponding to each prediction mode of the multiple prediction modes calculated based on the initial prediction value, to finally determine the optimal rate distortion cost, to determine whether to perform illumination compensation on the current block.

In some implementations of the disclosure, the encoder calculates a rate distortion cost with an original sample value of the current block by respectively adopting the initial prediction value and the illumination prediction value, to determine an illumination compensation usage flag, a current prediction mode corresponding to the optimal rate distortion cost, current motion information, and a target illumination compensation mode, and predicts the current block with the current prediction mode, the current motion information, and the target illumination compensation mode, to obtain a prediction value.

In some implementations of the disclosure, the encoder determines the initial prediction block corresponding to the current block based on the current motion information, performs motion compensation on the initial prediction block to obtain the first prediction block, performs illumination compensation on the first prediction block with the target illumination compensation mode, to obtain the second prediction block, and performs inter prediction on the second prediction block with the current prediction mode, to obtain the prediction value.

It will be understood that the illumination compensation method of the disclosure provides selection for inter prediction or the like in operations requiring illumination compensation or local linear transform or the like. For the region with obvious luma changes between the current frame and the reference frame, the linear transform model can be calculated by using the illumination compensation technology. After compensation is performed on the current coding block, the prediction block will be closer to the original picture block, making the residual error smaller, and finally improving the encoding efficiency.

It should be noted that the illumination compensation of the implementations of the disclosure can also be applied to the inter non-rectangular block prediction technology, that is, the illumination compensation technology is used in GPM in VVC and AWP technology in AVS. After the encoder combines the motion-compensated prediction blocks of two reference frames in some way to get a new prediction block, the illumination compensation technology can be used for prediction compensation. Some of the above ways can be taking non-rectangular region prediction samples of different prediction blocks respectively for combination. That is, for the current block, a second sub-prediction block is obtained by combining a non-rectangular region of a first sub-prediction block specified by one motion information and a complementary non-rectangular region of the first prediction block specified by another motion information. The inter non-rectangular block prediction technology can be GPM in VVC, AWP in AVS, inter-inter in AV, etc., which are not limited herein.

The illumination compensation is performed on the second sub-prediction block with the target illumination compensation mode, to obtain the target prediction block, which is the final prediction block of the current block.

In some implementations of the disclosure, in the illumination compensation method, a flag can be added into the group of pictures (GOP), i.e., a picture-set-level illumination compensation enabled flag, which is used to indicate whether the illumination compensation technology is enabled for the current GOP. The picture-set-level illumination compensation enabled flag needs to be signalled into the bitstream. For example, in a specific configuration, the video has 500 frames, 25 frames of the 500 frames are one picture set, and each frame with a picture-set-level enabled flag of 1 has a frame-level picture enabled flag, that is, an illumination compensation frame-level enabled flag, which can further save overhead of the bitstream.

In some implementations of the disclosure, the illumination compensation method can be combined with affine transformation prediction technology, such as AFFINE and PROF, which is improvement of AFFINE, in VVC, AFFINE, AFFINE_UMVE, and ASP in AVS, and other technologies. That is, the encoder performs illumination compensation on the prediction block, i.e., the reference block after affine motion compensation according to the affine transformation parameters.

In implementations of the disclosure, when parsing the bitstream, the encoder obtains a current affine transformation parameter, performs affine motion compensation on the current block based on the current affine transformation parameter, to obtain a third prediction block, determines a model parameter with the index information of the target illumination compensation mode, and performs illumination compensation on the third prediction block with the model parameter, to obtain a fourth prediction block. The fourth prediction block is the final prediction block of the current block.

In the implementation of the disclosure, when parsing the bitstream, the encoder obtains modified/refined motion information, performs motion compensation on the current block based on the modified/refined motion information, to obtain a fifth prediction block, determines a model parameter with the index information of the target illumination compensation mode, and performs illumination compensation on the fifth prediction block with the model parameter, to obtain a sixth prediction block. The sixth prediction block is the final prediction block of the current block.

The modified/refined motion information is determined by any one of ultimate motion vector expression, enhanced temporal motion vector prediction, motion vector angular prediction, or motion vector difference.

In implementations of the disclosure, the illumination compensation method can be combined with any technology for modifying/refining the MV, such as merge mode with MVD (MMVD) in VVC, and ultimate motion vector expression (UMVE), enhanced temporal motion vector prediction (ETMVP), and motion vector angular prediction (MVAP) in AVS, and other technologies. That is, the encoder performs illumination compensation on the prediction block, i.e., the MV-modified/refined/enhanced reference block after motion compensation.

Understandably, in the process of decoding the current block, in the case of using the illumination compensation technology, the encoder can directly obtain the illumination compensation frame-level enabled flag at the frame level from the bitstream, so that the encoder can determine from the frame level whether there is a need to continue to obtain a block-level illumination compensation usage flag, and only in the case that the illumination compensation frame-level enabled flag is valid, a CU-level flag in the bitstream can be obtained, and subsequent decoding can be performed, to perform prediction (such as inter prediction) on the current block. Therefore, when the illumination compensation frame-level enabled flag is invalid, the transmission bits of the bitstream will be greatly reduced. Therefore, when illumination compensation is selected for a frame-level picture based on different situations, an illumination compensation frame-level enabled flag at the frame level is added, to represent whether the illumination compensation technology is used, to save the bit overhead of coding and improve the performance of coding.

It should be noted that the description of the encoder is consistent with and corresponds to the principle of the decoder, which will not be repeated herein.

Figure 13:
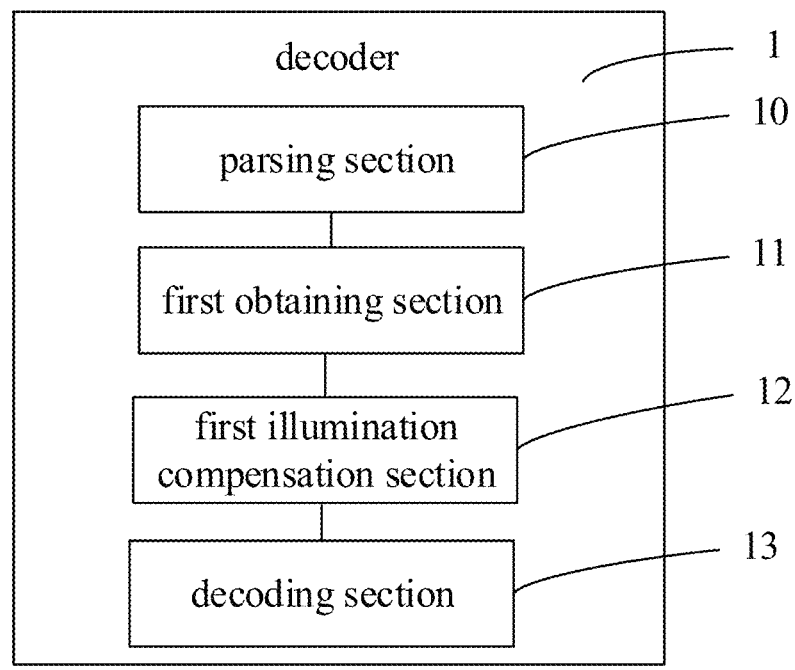
FIG. 13 is schematic structural diagram 1 of a decoder provided in implementations of the disclosure.

Based on the implementation basis of the foregoing implementations, as illustrated in FIG. 13, implementations of the disclosure provide a decoder 1. The decoder 1 includes a parsing section 10, a first obtaining section 11, and a first illumination compensation section 12.

The parsing section 10 is configured to: obtain a bitstream, and parse the bitstream to obtain an illumination compensation enabled flag. The first obtaining section 11 is configured to: obtain an illumination compensation frame-level enabled flag in the bitstream, when the illumination compensation enabled flag is valid, obtain an illumination compensation usage flag in the bitstream, when the illumination compensation frame-level enabled flag is valid, and obtain index information of a target illumination compensation mode in the bitstream, when the illumination compensation usage flag is valid. The first illumination compensation section 12 is configured to perform illumination compensation on a current block based on the index information of the target illumination compensation mode.

In some implementations of the disclosure, the illumination compensation frame-level enabled flag includes at least one illumination compensation frame-level enabled flag; and the at least one illumination compensation frame-level enabled flag is in one-to-one correspondence with different prediction modes of a current frame, or the at least one illumination compensation frame-level enabled flag is in one-to-one correspondence with different regions of the current frame.

In some implementations of the disclosure, the parsing section 10 is further configured to: when an i-th level of illumination compensation frame-level enabled flag in the N levels of illumination compensation frame-level enabled flags is valid, determine an (i+1)-th level of illumination compensation frame-level enabled flag in the bitstream until an N-th level of illumination compensation frame-level enabled flag in the bitstream is determined, where i is a positive integer greater than or equal to 1 and less than or equal to N, and N is a positive integer greater than or equal to 1; and when the (i+1)-th level of illumination compensation frame-level enabled flag is invalid, obtain the illumination compensation usage flag in the bitstream.

In some implementations of the disclosure, the illumination compensation frame-level enabled flag includes M illumination compensation frame-level enabled flags corresponding to picture regions; and the parsing section 10 is further configured to: when a j-th illumination compensation frame-level enabled flag in the M illumination compensation frame-level enabled flags is valid, determine a (j+1)-th illumination compensation frame-level enabled flag in the bitstream until an M-th illumination compensation frame-level enabled flag in the bitstream is determined, where j is a positive integer greater than or equal to 1 and less than or equal to M, and M is a positive integer greater than or equal to 1; and when the (j+1)-th illumination compensation frame-level enabled flag is invalid, obtain the illumination compensation usage flag in the bitstream.

In some implementations of the disclosure, the illumination compensation frame-level enabled flag includes M illumination compensation frame-level enabled flags corresponding to picture regions; and the parsing section 10 is further configured to: obtain the illumination compensation usage flag in the bitstream, when any one of the M illumination compensation frame-level enabled flags is valid.

In some implementations of the disclosure, when N=3, a first level of illumination compensation frame-level enabled flag corresponds to a merge mode/direct mode, a second level of illumination compensation frame-level enabled flag corresponds to a skip mode, and a third level of illumination compensation frame-level enabled flag corresponds to a normal inter mode.

In some implementations of the disclosure, the first illumination compensation section 12 is further configured to: skip illumination compensation, when a first level of illumination compensation frame-level enabled flag is invalid.

In some implementations of the disclosure, the first illumination compensation section 12 is further configured to: skip illumination compensation, when the first one of illumination compensation frame-level enabled flags is invalid.

In some implementations of the disclosure, the parsing section 10 is further configured to: obtain a picture region partition flag, when parsing the bitstream; and obtain the M illumination compensation frame-level enabled flags, when the picture region partition flag is valid. The first illumination compensation section 12 is further configured to: skip illumination compensation, when the picture region partition flag is invalid.

In some implementations of the disclosure, the first obtaining section 11 is further configured to partition the current block to obtain at least two sub-blocks corresponding to at least two regions.

In some implementations of the disclosure, the first illumination compensation section 12 is further configured to: determine reconstructed samples of a current frame and reconstructed reference samples of a reference frame based on the index information of the target illumination compensation mode; determine an h-th model parameter corresponding to an h-th region based on the reconstructed samples of the current frame and the reconstructed reference samples of the reference frame, where h is a positive integer greater than or equal to 1 and less than the number of the at least two sub-blocks; perform illumination compensation on the h-th region based on the h-th model parameter, to obtain an h-th region prediction block; and perform illumination compensation on an (h+1)-th region until illumination compensation on the at least two sub-blocks is completed.

In some implementations of the disclosure, the first illumination compensation section 12 is further configured to: when an h-th neighbouring reconstructed reference sample adjacent to the h-th region exists in the reconstructed reference samples of the reference frame, calculate the h-th model parameter based on the h-th neighbouring reconstructed reference sample and reconstructed samples of the h-th region in the reconstructed samples of the current frame; and when h is not equal to 1 and no reconstructed reference sample adjacent to the h-th region exists in the reconstructed reference samples of the reference frame, calculate the h-th model parameter based on neighbouring samples in an (h−1)-th region prediction block and the reconstructed samples of the h-th region in the reconstructed samples of the current frame.

In some implementations of the disclosure, the first illumination compensation section 12 is further configured to: when h is not equal to 1 and an h-th neighbouring reconstructed reference sample adjacent to the h-th region exists in the reconstructed reference samples of the reference frame, calculate the h-th model parameter based on the h-th neighbouring reconstructed reference sample, neighbouring samples in a first region prediction block to an (h−1)-th region prediction block, and reconstructed samples of the h-th region in the reconstructed samples of the current frame; and when h is not equal to 1 and no reconstructed reference sample adjacent to the h-th region exists in the reconstructed reference samples of the reference frame, calculate the h-th model parameter based on the neighbouring samples in the first region prediction block to the (h−1)-th region prediction block and the reconstructed samples of the h-th region in the reconstructed samples of the current frame.

In some implementations of the disclosure, the first illumination compensation section 12 is further configured to: when h is not equal to 1, weight at least one of a first model parameter to an (h−1)-th new model parameter with the h-th model parameter, to obtain an h-th new model parameter; and perform illumination compensation on the h-th region based on the h-th new model parameter, to obtain the h-th region prediction block, after determining the h-th model parameter corresponding to the h-th region based on the reconstructed samples of the current frame and the reconstructed reference samples of the reference frame.

In some implementations of the disclosure, the parsing section 10 is further configured to: obtain a block region partition flag, when parsing the bitstream. The first obtaining section 11 is further configured to partition the current block to obtain the at least two sub-blocks, when the block region partition flag is valid. The first illumination compensation section 12 is further configured to calculate a block model parameter of the current block, when the block region partition flag is invalid.

In some implementations of the disclosure, the decoder further includes a decoding section 13. The parsing section 10 is further configured to obtain current motion information and a current prediction mode, when parsing the bitstream. The decoding section 13 is configured to predict the current block according to the index information of the target illumination compensation mode, the current prediction mode, and the current motion information, to obtain a prediction value.

In some implementations of the disclosure, the decoding section 13 is further configured to determine an initial prediction block corresponding to the current block based on the current motion information; and perform motion compensation on the initial prediction block, to obtain a first prediction block. The first illumination compensation section 12 is further configured to: determine a model parameter with the index information of the target illumination compensation mode; and perform illumination compensation on the first prediction block with the model parameter, to obtain a second prediction block. The decoding section 13 is configured to perform inter prediction on the second prediction block with the current prediction mode, to obtain the prediction value.

In some implementations of the disclosure, during using an inter non-rectangular block prediction technology, for the current block, a second sub-prediction block is obtained by combining a non-rectangular region of a first sub-prediction block specified by one motion information and a complementary non-rectangular region of the first prediction block specified by another motion information. The first illumination compensation section 12 is further configured to perform illumination compensation on the second sub-prediction block with the target illumination compensation mode, to obtain a target prediction block.

In some implementations of the disclosure, the parsing section 10 is further configured to: obtain a picture-set-level illumination compensation enabled flag in the bitstream, when the illumination compensation enabled flag is valid; and obtain the illumination compensation frame-level enabled flag in the bitstream, when the picture-set-level illumination compensation enabled flag is valid.

In some implementations of the disclosure, the parsing section 10 is further configured to: obtain a current affine transformation parameter, when parsing the bitstream. The decoding section 13 is further configured to: perform affine motion compensation on the current block based on the current affine transformation parameter, to obtain a third prediction block. The first illumination compensation section 12 is further configured to: determine a model parameter with the index information of the target illumination compensation mode; and perform illumination compensation on the third prediction block with the model parameter, to obtain a fourth prediction block.

In some implementations of the disclosure, the parsing section 10 is further configured to: obtain modified/refined motion information, when parsing the bitstream. The decoding section 13 is further configured to: perform motion compensation on the current block based on the modified/refined motion information, to obtain a fifth prediction block. The first illumination compensation section 12 is further configured to: determine a model parameter with the index information of the target illumination compensation mode; and perform illumination compensation on the fifth prediction block with the model parameter, to obtain a sixth prediction block.

In some implementations of the disclosure, the modified/refined motion information is determined by any one of ultimate motion vector expression, enhanced temporal motion vector prediction, motion vector angular prediction, or motion vector difference.

Understandably, in the process of decoding the current block, in the case of using the illumination compensation technology, the decoder can directly obtain the illumination compensation frame-level enabled flag at the frame level from the bitstream, so that the encoder can determine from the frame level whether there is a need to continue to obtain a block-level illumination compensation usage flag, and only in the case that the illumination compensation frame-level enabled flag is valid, a CU-level flag in the bitstream can be obtained, and subsequent decoding can be performed, to perform prediction (such as inter prediction) on the current block. Therefore, when the illumination compensation frame-level enabled flag is invalid, the transmission bits of the bitstream will be greatly reduced. Therefore, when illumination compensation is selected for a frame-level picture based on different situations, an illumination compensation frame-level enabled flag at the frame level is added, to represent whether the illumination compensation technology is used, to save the bit overhead of coding and improve the performance of coding.

Figure 14:
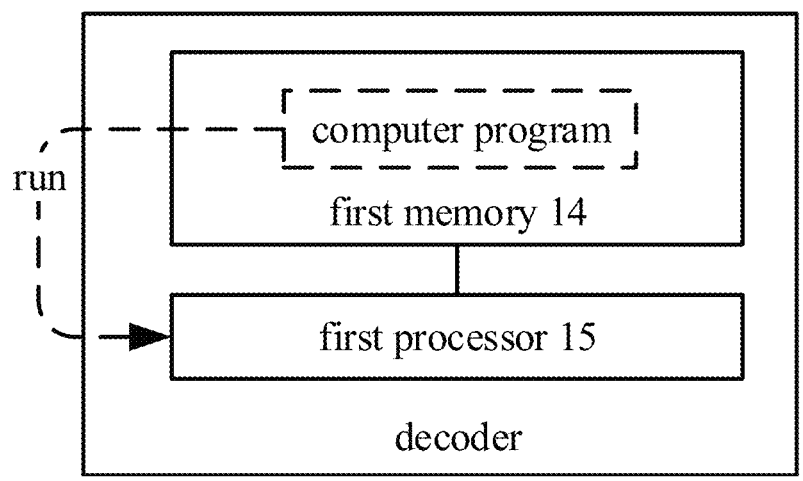
FIG. 14 is schematic structural diagram 2 of a decoder provided in implementations of the disclosure.

In the practical application of the disclosure, as illustrated in FIG. 14, implementations of the disclosure also provide a decoder. The decoder includes a memory such as a first memory 14 and at least one processor such as a first processor 15.

The first memory 14 stores a computer program executable on the first processor 15 and when executing the computer program, the first processor 15 implements the illumination compensation method corresponding the decoder.

The first processor 15 may be implemented by software, hardware, firmware, or a combination thereof, using circuitry, single or multiple application specific integrated circuits (ASIC), single or multiple general purpose integrated circuits, single or multiple microprocessors, single or multiple programmable logic devices, or combinations of the aforementioned circuitry or devices, or other suitable circuitry or devices, so that the first processor 15 may perform corresponding steps of the illumination compensation method at the decoder side in the aforementioned implementations.

Figure 15:
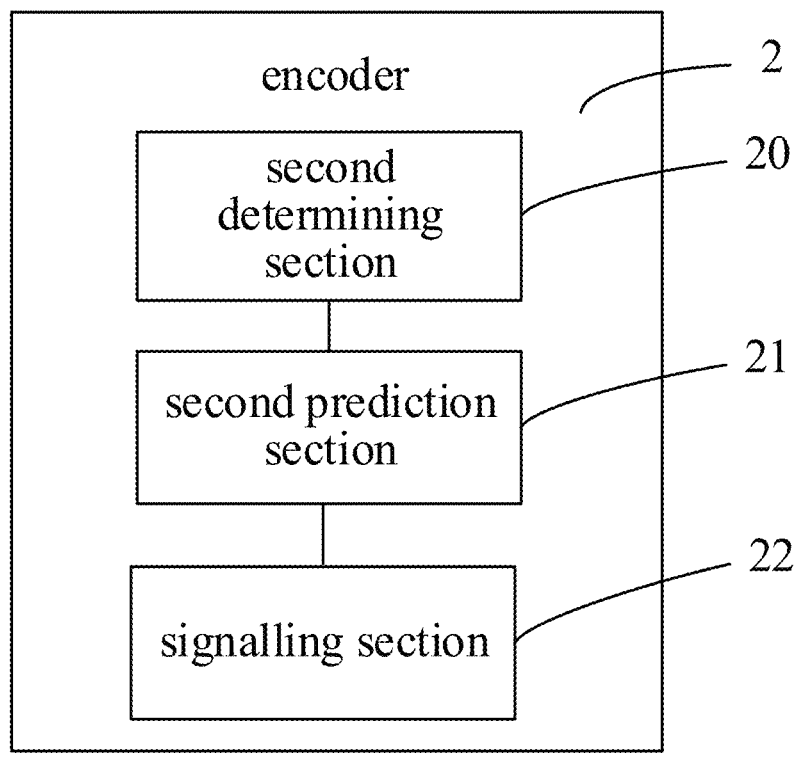
FIG. 15 is schematic structural diagram 1 of an encoder provided in implementations of the disclosure.

Implementations of the disclosure provide an encoder 2. As illustrated in FIG. 15, the encoder 2 includes a second determining section 20, a second prediction section 21, and a signalling section 22.

The second determining section 20 is configured to determine an illumination compensation frame-level enabled flag based on luma information of a current frame. The second prediction section 21 is configured to: enable an illumination compensation function for the current frame, and perform illumination compensation on a current block of the current frame, to obtain an illumination prediction value, when the illumination compensation frame-level enabled flag is valid. The signalling section 22 is configured to signal the illumination compensation frame-level enabled flag to a bitstream.

In some implementations of the disclosure, the second determining section 20 is further configured to: determine at least one luma difference value between the current frame and at least one reference frame based on the luma information of the current frame; and determine the illumination compensation frame-level enabled flag based on the at least one luma difference value and a preset luma change threshold.

In some implementations of the disclosure, the second determining section 20 is further configured to: when a luma difference value greater than the preset luma change threshold exists in the at least one luma difference value, determine a valid illumination compensation frame-level enabled flag corresponding to the luma difference value; and when no luma difference value greater than the preset luma change threshold exists in the at least one luma difference value, determine an invalid illumination compensation frame-level enabled flag.

In some implementations of the disclosure, the preset luma change threshold includes: a first preset luma change threshold and a second preset luma change threshold, the second preset luma change threshold is greater than the first preset luma change threshold, and the illumination compensation frame-level enabled flag includes N levels of illumination compensation frame-level enabled flags corresponding to prediction modes; and the second determining section 20 is further configured to: determine that the N levels of illumination compensation frame-level enabled flags are all valid, when the at least one luma difference value is greater than the second preset luma change threshold; determine that the N levels of illumination compensation frame-level enabled flags are all invalid, when the at least one luma difference value is less than the first preset luma change threshold; and determine that a first level of illumination compensation frame-level enabled flag is valid and other levels of illumination compensation frame-level enabled flags are invalid, when the at least one luma difference value is greater than the first preset luma change threshold and is less than the second preset luma change threshold.

In some implementations of the disclosure, when N=3, the first level of illumination compensation frame-level enabled flag corresponds to a merge mode/direct mode, a second level of illumination compensation frame-level enabled flag corresponds to a skip mode, and a third level of illumination compensation frame-level enabled flag corresponds to a normal inter mode.

In some implementations of the disclosure, the second determining section 20 is further configured to: perform region partition on the current frame, to obtain M picture regions and a valid picture region partition flag; and calculate luma information of the M picture regions, to obtain corresponding M luma information. The signalling section 22 is further configured to: signal the picture region partition flag into the bitstream.

In some implementations of the disclosure, the luma information of the current frame includes the M luma information of the M picture regions; and the second determining section 20 is further configured to: determine the illumination compensation frame-level enabled flag based on the M luma information and a preset luma information threshold.

In some implementations of the disclosure, the illumination compensation frame-level enabled flag includes M illumination compensation frame-level enabled flags corresponding to the picture regions; and the second determining section 20 is further configured to: when luma information greater than the preset luma information threshold exists in the M luma information, determine a valid illumination compensation frame-level enabled flag corresponding to the luma information; and when no luma information greater than the preset luma information threshold exists in the M luma information, determine an invalid illumination compensation frame-level enabled flag, and obtain the M illumination compensation frame-level enabled flags until comparison of the M luma information is completed.

In some implementations of the disclosure, the second determining section 20 is further configured to: perform region partition on the current block, to obtain at least two sub-blocks of at least two regions.

In some implementations of the disclosure, the second prediction section 21 is further configured to: traverse multiple candidate motion information, to determine an initial prediction value of an initial prediction block corresponding to each of the at least two sub-blocks, where the initial prediction block is in one-to-one correspondence to the multiple candidate motion information, the at least two sub-blocks belong to the current frame, and the initial prediction block belongs to a reference frame; and for the initial prediction block of each sub-block, traverse different illumination compensation modes for illumination compensation, to obtain corresponding illumination prediction values, when the illumination compensation frame-level enabled flag is valid.

In some implementations of the disclosure, the second prediction section 21 is further configured to: for each illumination compensation mode, determine reconstructed samples of the current frame and reconstructed reference samples of a reference frame; determine an h-th model parameter corresponding to an h-th region based on the reconstructed samples of the current frame and the reconstructed reference samples of the reference frame, where h is a positive integer greater than or equal to 1 and less than the number of the at least two sub-blocks; perform illumination compensation on the h-th region based on the h-th model parameter, to obtain an h-th illumination prediction value of an h-th region prediction block; and perform illumination compensation on an (h+1)-th region until illumination compensation on the at least two sub-blocks of the at least two regions is completed.

In some implementations of the disclosure, the second prediction section 21 is further configured to: when an h-th neighbouring reconstructed reference sample adjacent to the h-th region exists in the reconstructed reference samples of the reference frame, calculate the h-th model parameter based on the h-th neighbouring reconstructed reference sample and reconstructed samples of the h-th region in the reconstructed samples of the current frame; and when h is not equal to 1 and no reconstructed reference sample adjacent to the h-th region exists in the reconstructed reference samples of the reference frame, calculate the h-th model parameter based on neighbouring samples in an (h−1)-th region prediction block and the reconstructed samples of the h-th region in the reconstructed samples of the current frame.

In some implementations of the disclosure, the second prediction section 21 is further configured to: when h is not equal to 1 and an h-th neighbouring reconstructed reference sample adjacent to the h-th region exists in the reconstructed reference samples of the reference frame, calculate the h-th model parameter based on the h-th neighbouring reconstructed reference sample, neighbouring samples in a first region prediction block to an (h−1)-th region prediction block, and reconstructed samples of the h-th region in the reconstructed samples of the current frame; and when h is not equal to 1 and no reconstructed reference sample adjacent to the h-th region exists in the reconstructed reference samples of the reference frame, calculate the h-th model parameter based on the neighbouring samples in the first region prediction block to the (h−1)-th region prediction block and the reconstructed samples of the h-th region in the reconstructed samples of the current frame.

In some implementations of the disclosure, the second prediction section 21 is further configured to: when h is not equal to 1, weight at least one of a first model parameter to an (h−1)-th new model parameter with the h-th model parameter, to obtain an h-th new model parameter; and perform illumination compensation on the h-th region based on the h-th new model parameter, to obtain the h-th illumination prediction value of the h-th region prediction block, after determining the h-th model parameter corresponding to the h-th region based on the reconstructed samples of the current frame and the reconstructed reference samples of the reference frame.

In some implementations of the disclosure, the second determining section 20 is further configured to: generate a valid block region partition flag and the signalling section 22 is further configured to: signal the valid block region partition flag into the bitstream.

In some implementations of the disclosure, the second prediction section 21 is further configured to: calculate a rate distortion cost with an original sample value of the current block by respectively adopting the initial prediction value and the illumination prediction value, to determine an illumination compensation usage flag, a current prediction mode corresponding to the optimal rate distortion cost, current motion information, and a target illumination compensation mode; and predict the current block with the current prediction mode, the current motion information, and the target illumination compensation mode, to obtain a prediction value.

In some implementations of the disclosure, the second prediction section 21 is further configured to: determine an initial prediction block corresponding to the current block based on the current motion information; perform motion compensation on the initial prediction block, to obtain a first prediction block; perform illumination compensation on the first prediction block with the target illumination compensation mode, to obtain a second prediction block; and perform inter prediction on the second prediction block with the current prediction mode, to obtain the prediction value.

In some implementations of the disclosure, during using an inter non-rectangular block prediction technology, for the current block, a second sub-prediction block is obtained by combining a non-rectangular region of a first sub-prediction block specified by one motion information and a complementary non-rectangular region of the first prediction block specified by another motion information; and the second prediction section 21 is further configured to: perform illumination compensation on the second sub-prediction block with the target illumination compensation mode, to obtain a target prediction block.

In some implementations of the disclosure, the second determining section 20 is further configured to: determine a picture-set-level illumination compensation enabled flag, when the illumination compensation enabled flag is valid; and determine an illumination compensation frame-level enabled flag of each frame in a picture set, when the picture-set-level illumination compensation enabled flag is valid.

In some implementations of the disclosure, the second prediction section 21 is further configured to: obtain a current affine transformation parameter; perform affine motion compensation on the current block based on the current affine transformation parameter, to obtain a third prediction block; and perform illumination compensation on the third prediction block with the target illumination compensation mode, to obtain a fourth prediction block.

In some implementations of the disclosure, the second prediction section 21 is further configured to: obtain modified/refined motion information; perform motion compensation on the current block based on the modified/refined motion information, to obtain a fifth prediction block; and perform illumination compensation on the fifth prediction block with the target illumination compensation mode, to obtain a sixth prediction block.

In some implementations of the disclosure, the modified/refined motion information is determined by any one of ultimate motion vector expression, enhanced temporal motion vector prediction, motion vector angular prediction, or motion vector difference.

In some implementations of the disclosure, the second determining section 20 is further configured to: determine a size of the current block; and determine an illumination compensation mode of the current block based on the size of the current block and a prediction size threshold.

In some implementations of the disclosure, the second determining section 20 is further configured to: determine that the illumination compensation mode of the current block is at least one of: a top-left illumination compensation mode, a top illumination compensation mode, or a left illumination compensation mode, when the size of the current block is less than the prediction size threshold; or determine that the illumination compensation mode of the current block is at least one of: the top-left illumination compensation mode, the top illumination compensation mode, or the left illumination compensation mode, when the size of the current block is greater than the prediction size threshold.

Understandably, in the process of decoding the current block, in the case of using the illumination compensation technology, the encoder can directly obtain the illumination compensation frame-level enabled flag at the frame level from the bitstream, so that the encoder can determine from the frame level whether there is a need to continue to obtain a block-level illumination compensation usage flag, and only in the case that the illumination compensation frame-level enabled flag is valid, a CU-level flag in the bitstream can be obtained, and subsequent decoding can be performed, to perform prediction (such as inter prediction) on the current block. Therefore, when the illumination compensation frame-level enabled flag is invalid, the transmission bits of the bitstream will be greatly reduced. Therefore, when illumination compensation is selected for a frame-level picture based on different situations, an illumination compensation frame-level enabled flag at the frame level is added, to represent whether the illumination compensation technology is used, to save the bit overhead of coding and improve the performance of coding.

Figure 16:
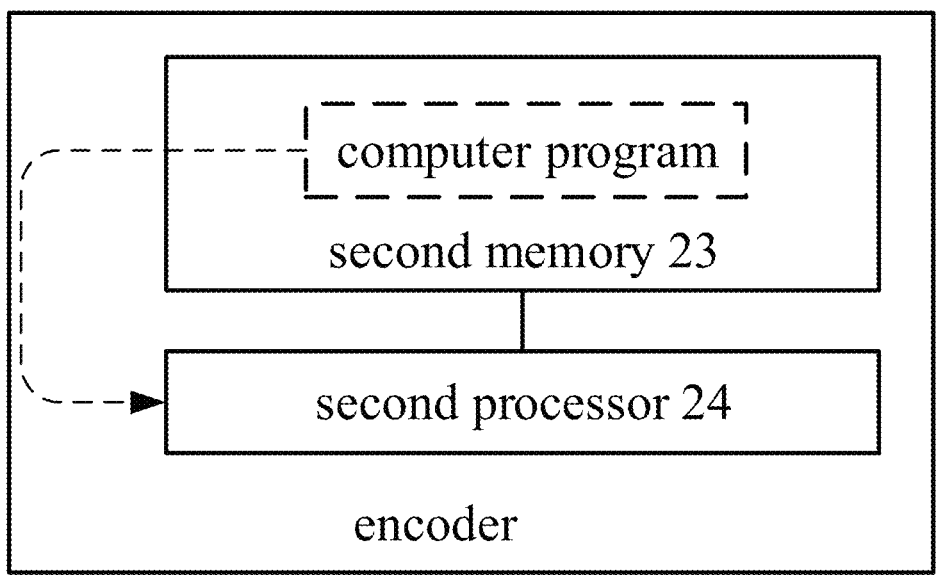
FIG. 16 is schematic structural diagram 2 of an encoder provided in implementations of the disclosure.

In the practical application of the disclosure, as illustrated in FIG. 16, implementations of the disclosure also provide an encoder. The encoder includes a memory such as a second memory 23 and at least one processor such as a second processor 24.

The second memory 23 stores a computer program executable on the second processor 24 and when executing the computer program, the second processor 24 implements the illumination compensation method corresponding the encoder.

Implementations of the disclosure provide a storage medium. The storage medium stores a computer program. When the computer program is executed by a first processor, the illumination compensation method corresponding to the decoder of the claim is implemented. Alternatively, when the computer program is executed by a second processor, the illumination compensation method corresponding to the encoder of the claim is implemented.

The sections in various implementations of the disclosure may be integrated into one processing unit, or each unit may be physically present, or two or more units may be integrated into one unit. The above-mentioned integrated unit can be implemented in the form of hardware or a software functional unit.

The integrated unit may be stored in a computer readable storage when it is implemented in the form of a software functional unit and is sold or used as a separate product. Based on such understanding, the technical solutions of the disclosure essentially, or the part of the technical solutions that contributes to the related art, or all or part of the technical solutions, may be embodied in the form of a software product which is stored in a storage medium and includes instructions for causing a computer device (which may be a personal computer, a server, or a network device and so on) or a processor to perform all or part of the steps described in the various implementations of the disclosure. The above storage medium includes various media that can store program codes, such as ferromagnetic random access memory (FRAM), read-only memory (ROM), programmable read-only memory (PROM), erasable programmable read-only memory (EPROM), electrically erasable programmable read-only memory (EEPROM), flash memory, magnetic surface memory, an optical disc, or CD-ROM, compact disc read-only memory, which is not limited in the implementations of the disclosure.

The above are some implementations of the disclosure, but the protection scope of the disclosure is not limited thereto. Any changes or substitutions that can be easily conceived by those skilled in the art within the technical scope disclosed by the disclosure should be covered by the protection scope of the disclosure. Therefore, the protection scope of the disclosure should be subject to the protection scope of the claims.

INDUSTRIAL APPLICABILITY

Implementations of the disclosure provide the illumination compensation method, the encoder, the decoder, and the storage medium. The bitstream is obtained, and the bitstream is parsed to obtain the illumination compensation enabled flag, the current motion information, and the current prediction mode. The illumination compensation frame-level enabled flag in the bitstream is obtained, when the illumination compensation enabled flag is valid. The illumination compensation usage flag in the bitstream is obtained, when the illumination compensation frame-level enabled flag is valid. The index information of the target illumination compensation mode in the bitstream is obtained, when the illumination compensation usage flag is valid. The illumination compensation is performed on the current block based on the index information of the target illumination compensation mode. By adopting the above technical solution, in the process of decoding the current block, in the case of using the illumination compensation technology, the decoder can directly obtain the illumination compensation frame-level enabled flag at the frame level from the bitstream, so that the encoder can determine from the frame level whether there is a need to continue to obtain a block-level illumination compensation usage flag, and only in the case that the illumination compensation frame-level enabled flag is valid, a CU-level flag in the bitstream can be obtained, and subsequent decoding can be performed, to perform prediction (such as inter prediction) on the current block. Therefore, when the illumination compensation frame-level enabled flag is invalid, the transmission bits of the bitstream will be greatly reduced. Therefore, when illumination compensation is selected for the frame-level picture based on different situations, the illumination compensation frame-level enabled flag at the frame level is added, to represent whether the illumination compensation technology is used, to save the bit overhead of coding and improve the performance of coding.

What is claimed is:

1. An illumination compensation method, applied to a decoder and comprising:
obtaining a bitstream, and parsing the bitstream to obtain an illumination compensation enabled flag;
obtaining an illumination compensation frame-level enabled flag in the bitstream, when the illumination compensation enabled flag is valid;
obtaining an illumination compensation usage flag in the bitstream, when the illumination compensation frame-level enabled flag is valid;
obtaining index information of a target illumination compensation mode in the bitstream, when the illumination compensation usage flag is valid;
performing illumination compensation on a current block based on the index information of the target illumination compensation mode;
obtaining current motion information and a current prediction mode, when parsing the bitstream;
predicting the current block according to the index information of the target illumination compensation mode, the current prediction mode, and the current motion information, to obtain a prediction value;
obtaining modified/refined motion information, when parsing the bitstream, wherein the modified/refined motion information is determined by any one of enhanced temporal motion vector prediction or motion vector angular prediction;
performing motion compensation on the current block based on the modified/refined motion information, to obtain a motion-compensated prediction block;
determining a model parameter with the index information of the target illumination compensation mode; and
performing illumination compensation on the motion-compensated prediction block with the model parameter, to obtain an illumination-compensated prediction block.

2. The method of claim 1, wherein:
the illumination compensation frame-level enabled flag comprises at least one illumination compensation frame-level enabled flag; and
the at least one illumination compensation frame-level enabled flag is in one-to-one correspondence with different prediction modes of a current frame.

3. An illumination compensation method, applied to an encoder and comprising:
determining an illumination compensation frame-level enabled flag based on luma information of a current frame;
enabling an illumination compensation function for the current frame, and performing illumination compensation on a current block of the current frame, to obtain an illumination prediction value, when the illumination compensation frame-level enabled flag is valid;
signalling the illumination compensation frame-level enabled flag to a bitstream;
determining an illumination compensation usage flag, a current prediction mode, current motion information, and a target illumination compensation mode;
predicting the current block with the current prediction mode, the current motion information, and the target illumination compensation mode, to obtain a prediction value;
obtaining modified/refined motion information, wherein the modified/refined motion information is determined by any one of enhanced temporal motion vector prediction or motion vector angular prediction;
performing motion compensation on the current block based on the modified/refined motion information, to obtain a motion-compensated prediction block; and
performing illumination compensation on the motion-compensated prediction block with the target illumination compensation mode, to obtain an illumination-compensated prediction block.

4. The method of claim 3, wherein:
the illumination compensation frame-level enabled flag comprises at least one illumination compensation frame-level enabled flag; and
the at least one illumination compensation frame-level enabled flag is in one-to-one correspondence with different prediction modes of a current frame.

5. A decoder, comprising:
at least one processor; and
a memory coupled to the at least one processor and storing at least one computer executable instruction thereon which, when executed by the at least one processor, causes the at least one processor to:
obtain a bitstream, and parse the bitstream to obtain an illumination compensation enabled flag;
obtain an illumination compensation frame-level enabled flag in the bitstream, when the illumination compensation enabled flag is valid;
obtain an illumination compensation usage flag in the bitstream, when the illumination compensation frame-level enabled flag is valid;
obtain index information of a target illumination compensation mode in the bitstream, when the illumination compensation usage flag is valid;
perform illumination compensation on a current block based on the index information of the target illumination compensation mode;
obtain current motion information and a current prediction mode, when parsing the bitstream;
predict the current block according to the index information of the target illumination compensation mode, the current prediction mode, and the current motion information, to obtain a prediction value;
obtain modified/refined motion information, when parsing the bitstream, wherein the modified/refined motion information is determined by any one of enhanced temporal motion vector prediction or motion vector angular prediction;
perform motion compensation on the current block based on the modified/refined motion information, to obtain a motion-compensated prediction block;
determine a model parameter with the index information of the target illumination compensation mode; and
perform illumination compensation on the motion-compensated prediction block with the model parameter, to obtain an illumination-compensated prediction block.

6. The decoder of claim 5, wherein:
the illumination compensation frame-level enabled flag comprises at least one illumination compensation frame-level enabled flag; and
the at least one illumination compensation frame-level enabled flag is in one-to-one correspondence with different prediction modes of a current frame.

7. An encoder, comprising:
at least one processor; and
a memory coupled to the at least one processor and storing at least one computer executable instruction thereon which, when executed by the at least one processor, causes the at least one processor to:

determine an illumination compensation frame-level enabled flag based on luma information of a current frame;

enable an illumination compensation function for the current frame, and perform illumination compensation on a current block of the current frame, to obtain an illumination prediction value, when the illumination compensation frame-level enabled flag is valid;

signal the illumination compensation frame-level enabled flag to a bitstream;

determine an illumination compensation usage flag, a current prediction mode, current motion information, and a target illumination compensation mode;

predict the current block with the current prediction mode, the current motion information, and the target illumination compensation mode, to obtain a prediction value;

obtain modified/refined motion information, wherein the modified/refined motion information is determined by any one of enhanced temporal motion vector prediction or motion vector angular prediction;

perform motion compensation on the current block based on the modified/refined motion information, to obtain a motion-compensated prediction block; and perform illumination compensation on the motion-compensated prediction block with the target illumination compensation mode, to obtain an illumination-compensated prediction block.

8. The encoder of claim 7, wherein:

the illumination compensation frame-level enabled flag comprises at least one illumination compensation frame-level enabled flag; and the at least one illumination compensation frame-level enabled flag is in one-to-one correspondence with different prediction modes of a current frame.

* * * * *